(12) United States Patent
Xiang et al.

(10) Patent No.: US 10,863,375 B2
(45) Date of Patent: Dec. 8, 2020

(54) CHANNEL MEASUREMENT METHOD AND APPARATUS

(71) Applicant: HUAWEI TECHNOLOGIES CO., LTD., Shenzhen (CN)

(72) Inventors: Zhengzheng Xiang, Shanghai (CN); Jiyong Pang, Shanghai (CN); Sheng Liu, Shanghai (CN); Jun Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 164 days.

(21) Appl. No.: 16/051,518

(22) Filed: Aug. 1, 2018

(65) Prior Publication Data

US 2018/0343580 A1 Nov. 29, 2018

Related U.S. Application Data

(63) Continuation of application No. PCT/CN2017/070991, filed on Jan. 12, 2017.

(30) Foreign Application Priority Data

Feb. 1, 2016 (CN) .......................... 2016 1 0071088

(51) Int. Cl.
*H04W 24/10* (2009.01)
*H04W 24/08* (2009.01)
(Continued)

(52) U.S. Cl.
CPC ........... *H04W 24/10* (2013.01); *H04L 1/0026* (2013.01); *H04L 5/0048* (2013.01);
(Continued)

(58) Field of Classification Search
CPC ................ H04W 24/00; H04W 24/06; H04W 72/0413; H04W 72/1226; H04W 40/12;
(Continued)

(56) References Cited

U.S. PATENT DOCUMENTS

| 10,027,512 | B2 * | 7/2018 | Seok ..................... H04L 5/0057 |
| 2011/0199946 | A1 * | 8/2011 | Breit .................... H04B 7/0626 370/310 |

(Continued)

FOREIGN PATENT DOCUMENTS

| CN | 101479958 A | 7/2009 |
| CN | 103312466 A | 9/2013 |

(Continued)

*Primary Examiner* — Warner Wong
(74) *Attorney, Agent, or Firm* — Kilpatrick Townsend & Stockton LLP

(57) ABSTRACT

A method includes: sending, by an access point AP, a channel measurement trigger frame TF-S to at least two stations STAs, where the TF-S is used to trigger the at least two STAs to send null data packets NDPs used for uplink channel measurement, the TF-S includes parameter indication information of a transmission parameter used by each STA to send the NDP, and the parameter indication information is used by the STA to determine the transmission parameter and a transmission time; and receiving, by the AP, an NDP sent by each of the at least two STAs based on a corresponding transmission parameter of the STA at a transmission time corresponding to the STA, and performing channel measurement, where there is no interframe gap between NDPs sent by any two adjacent STAs of the at least two STAs.

12 Claims, 20 Drawing Sheets

(51) Int. Cl.
   *H04L 1/00*     (2006.01)
   *H04L 5/00*     (2006.01)
   *H04L 27/26*    (2006.01)
   *H04L 29/06*    (2006.01)
   *H04W 72/04*    (2009.01)

(52) U.S. Cl.
   CPC ......... *H04L 27/2613* (2013.01); *H04W 24/08* (2013.01); *H04L 65/80* (2013.01); *H04W 72/0413* (2013.01)

(58) Field of Classification Search
   CPC ............. H04W 52/241; H04L 27/2613; H04L 1/0026; H04L 5/0048; H04L 43/00; H04L 43/04; H04L 43/08; H04L 65/80
   See application file for complete search history.

(56) References Cited

U.S. PATENT DOCUMENTS

| | | | |
|---|---|---|---|
| 2011/0299480 A1* | 12/2011 | Breit | H04B 7/0626 370/329 |
| 2012/0020226 A1* | 1/2012 | Trainin | H04B 7/063 370/252 |
| 2012/0076179 A1* | 3/2012 | Stacey | H04W 74/06 375/219 |
| 2012/0140753 A1* | 6/2012 | Lee | H04B 7/0452 370/338 |
| 2014/0079010 A1* | 3/2014 | Li | H04L 1/1809 370/329 |
| 2014/0126405 A1* | 5/2014 | Han | H04L 5/0057 370/252 |
| 2014/0160964 A1* | 6/2014 | Trainin | H04W 88/08 370/252 |
| 2015/0071233 A1* | 3/2015 | Wang | H04L 5/006 370/329 |
| 2015/0110046 A1* | 4/2015 | Merlin | H04B 7/024 370/329 |
| 2016/0150434 A1* | 5/2016 | Abinader, Jr. | H04W 4/06 455/67.11 |
| 2016/0156497 A1 | 6/2016 | Yang et al. | |
| 2016/0278081 A1 | 9/2016 | Chun et al. | |
| 2017/0033898 A1* | 2/2017 | Chun | H04W 84/12 |
| 2017/0054542 A1* | 2/2017 | Vermani | H04L 5/0057 |
| 2017/0257153 A1* | 9/2017 | Xia | H04B 7/0617 |

FOREIGN PATENT DOCUMENTS

| | | |
|---|---|---|
| CN | 104253673 A | 12/2014 |
| WO | 2014206115 A1 | 12/2014 |
| WO | 2015068968 A1 | 5/2015 |

* cited by examiner

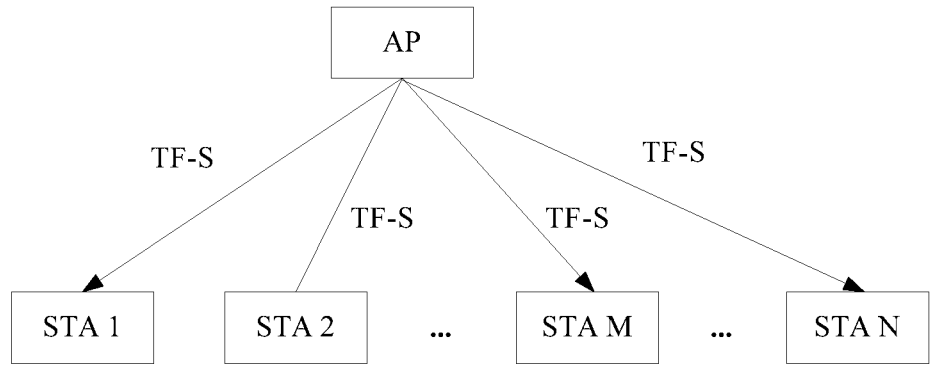

FIG. 2B

| Frame control | Duration | (A1) | A2 | Common signaling field | STA 1 signaling field | ... | STA N signaling field | Frame check sequence |

FIG. 2C

| STA M signaling field | AID | Spatial flow indication information | $RU_M$ indication information | Other information |

FIG. 2D

| STA M signaling field | AID | Spatial flow indication information | Other information |

FIG. 2E

| STA M signaling field | AID | $RU_M$ indication information | Other information |

FIG. 2F

CHANNEL MEASUREMENT METHOD AND APPARATUS

CROSS-REFERENCE TO RELATED APPLICATIONS

This application is a continuation of International Application No. PCT/CN2017/070991, filed on Jan. 12, 2017, which claims priority to Chinese Patent Application No. 201610071088.5 filed on Feb. 1, 2016. The disclosures of the aforementioned applications are hereby incorporated by reference in their entireties.

TECHNICAL FIELD

Embodiments of the present invention relate to communications technologies, and in particular, to a channel measurement method and apparatus.

BACKGROUND

Channel measurement is a quite important wireless communications technology. A transmit end may obtain a channel status of each receiving node through channel measurement, to perform user scheduling, precoding design, multi-user multiple-input multiple-output (MU-MIMO for short) transmission, or the like, thereby increasing a wireless network capacity.

During uplink multi-user channel measurement, an access point (Access Point, AP for short) needs to measure channels between the access point and multiple stations (Station, STA for short), that is, each STA needs to send a null data packet (NDP) to the AP. FIG. 1 is a schematic flowchart of uplink multi-user channel measurement in the prior art. As shown in FIG. 1, (1) an AP sends an uplink null data packet announcement (Null Data Packet Announcement, NDPA for short) to each STA (for example, STAs), where the NDPA is used to instruct each STA to send an NDP used for uplink channel measurement; (2) after receiving the NDPA, the $1^{st}$ STA (for example, a STA 1) sends an NDP to the AP, where the $1^{st}$ STA is a STA corresponding to the $1^{st}$ STA signaling field of all STA signaling fields included in the NDPA; (3) after receiving the NDP, the AP implements channel measurement between the AP and the STA 1; and (4) the AP sends uplink polling frames to other STAs in sequence, so that all the STAs send respective NDPs to the AP in sequence after receiving corresponding uplink polling frames, until an entire uplink channel measurement process is complete.

It can be learned that, in the prior art, an AP needs to send uplink polling frames to all STAs in sequence to instruct all the STAs to send respective NDPs to the AP in sequence (if there are N uplink STAs, at least N interactions between the AP and the STAs are required in an entire uplink channel measurement process); therefore, relatively long time is required for channel measurement.

SUMMARY

Embodiments of the present invention provide a channel measurement method and apparatus, to improve channel measurement efficiency.

According to a first aspect, an embodiment of the present invention provides a channel measurement method, including:

sending, by an access point AP, a channel measurement trigger frame TF-S to at least two stations STAs, where the TF-S is used to trigger the at least two STAs to send null data packets NDPs used for uplink channel measurement, the TF-S includes parameter indication information of a transmission parameter used by each STA to send the NDP, and the parameter indication information is used by the STA to determine the transmission parameter and a transmission time; and receiving, by the AP, an NDP sent by each of the at least two STAs based on a corresponding transmission parameter of the STA at a transmission time corresponding to the STA, and performing channel measurement, where there is no interframe gap between NDPs sent by any two adjacent STAs of the at least two STAs.

In the present invention, the access point AP sends the channel measurement trigger frame TF-S to the at least two stations STAs, so that each STA determines a respective transmission parameter and transmission time based on the parameter indication information, carried in the TF-S, of the transmission parameter used by the STA to send the NDP, and automatically sends the NDP to the AP based on the corresponding transmission parameter at the respective transmission time. Further, the AP receives the NDPs sent by the at least two STAs (there is no interframe gap between NDPs sent by all adjacent STAs), and performs channel measurement. It can be learned that, in this embodiment of the present invention, after the AP sends the TF-S to the at least two STAs simultaneously, the at least two STAs automatically determine the respective transmission times at which the NDPs are sent and automatically send the NDPs to the AP at the corresponding transmission times. In addition, there is no interframe gap between NDPs sent by all adjacent STAs. In this way, a time required for channel measurement is shortened, and channel measurement efficiency is improved.

In a specific example, the parameter indication information of the transmission parameter used by each STA to send the NDP includes one of or any combination of the following information:

an association identifier AID of the STA, spatial flow indication information of the STA, and channel resource unit RU indication information used by the STA to send the NDP.

The AID of the STA is used to indicate that the STA needs to send the NDP to the AP; and the spatial flow indication information of the STA includes indication information used by the STA to send a training sequence part of the NDP to the AP. It can be learned that the TF-S carries the parameter indication information of the transmission parameter used by each STA to send the NDP, so that each STA automatically determines a transmission parameter and a transmission time.

More specifically, the TF-S further includes a carrier sense indication corresponding to each STA; the carrier sense indication is used to indicate whether the STA needs to perform carrier sense; and if the carrier sense indication indicates that the STA does not need to perform carrier sense, the STA directly sends the NDP to the AP, or if the carrier sense indication indicates that the STA needs to perform carrier sense, the STA performs carrier sense before sending the NDP to the AP. It can be learned that each STA may determine, based on the carrier sense indication, whether to perform carrier sense, instead of performing carrier sense each time before sending the NDP. This further shortens a time required for channel measurement, and improves channel measurement efficiency.

Correspondingly, according to a second aspect, an embodiment of the present invention provides a channel measurement method, including:

receiving, by a first station STA, a channel measurement trigger frame TF-S sent by an access point AP, where the TF-S is used to trigger at least two STAs to send null data packets NDPs used for uplink channel measurement, the TF-S includes parameter indication information of a transmission parameter used by each STA to send the NDP, and the first STA is one of the at least two STAs;

determining, by the first STA, a transmission parameter and a transmission time based on the parameter indication information; and sending, by the first STA, an NDP to the AP based on the transmission parameter at the transmission time, where there is no interframe gap between the NDP and an NDP sent by any STA adjacent to the STA.

In the present invention, the first station STA receives the channel measurement trigger frame TF-S that carries the parameter indication information and that is sent by the access point AP. Further, the first STA automatically determines the transmission parameter and the transmission time based on the parameter indication information, and automatically sends the NDP (there is no interframe gap between the NDP and an NDP sent by any STA adjacent to the STA) to the AP based on the transmission parameter at the transmission time, so that the AP performs channel measurement based on the NDP. It can be learned that in this embodiment of the present invention, the first STA automatically determines the transmission time at which the NDP is sent, and automatically sends the NDP to the AP at the corresponding transmission time, and there is no interframe gap between the NDP and an NDP sent by any STA adjacent to the STA. This shortens a time required for channel measurement, and improves channel measurement efficiency.

According to a third aspect, an embodiment of the present invention provides a channel measurement apparatus, where an access point AP includes the channel measurement apparatus, and the apparatus includes:

a sending module, configured to send a channel measurement trigger frame TF-S to at least two stations STAs, where the TF-S is used to trigger the at least two STAs to send null data packets NDPs used for uplink channel measurement, the TF-S includes parameter indication information of a transmission parameter used by each STA to send the NDP, and the parameter indication information is used by the STA to determine the transmission parameter and a transmission time; and a receiving module, configured to: receive an NDP sent by each of the at least two STAs based on a corresponding transmission parameter of the STA at a transmission time corresponding to the STA, and perform channel measurement, where there is no interframe gap between NDPs sent by any two adjacent STAs of the at least two STAs.

According to a fourth aspect, an embodiment of the present invention provides a channel measurement apparatus, where a first station STA includes the channel measurement apparatus, and the apparatus includes:

a receiving module, configured to receive a channel measurement trigger frame TF-S sent by an access point AP, where the TF-S is used to trigger at least two STAs to send null data packets NDPs used for uplink channel measurement, the TF-S includes parameter indication information of a transmission parameter used by each STA to send the NDP, and the first STA is one of the at least two STAs;

a first determining module, configured to determine a transmission parameter and a transmission time based on the parameter indication information; and a sending module, configured to send an NDP to the AP based on the transmission parameter at the transmission time, where there is no interframe gap between the NDP and an NDP sent by any STA adjacent to the STA.

In the present invention, after the AP sends the TF-S to the at least two STAs simultaneously, the at least two STAs automatically determine respective transmission times at which the NDPs are sent and send the NDPs to the AP at the corresponding transmission times; and there is no interframe gap between NDPs sent by all adjacent STAs. This shortens a time required for channel measurement, and improves channel measurement efficiency.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 2B is a schematic diagram of an application scenario according to the present invention;

FIG. 2C is a schematic diagram of a frame structure of a TF-S;

FIG. 2D is schematic format diagram 1 of a STA M signaling field;

FIG. 2E is schematic format diagram 2 of a STA M signaling field;

FIG. 2F is schematic format diagram 3 of a STA M signaling field;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

An access point (AP, Access Point), also referred to as a wireless access point, a bridge, a hotspot, or the like, may access a server or a communications network.

A station (STA, Station), also referred to as a user, may be a wireless sensor, a wireless communications terminal, or a mobile terminal, for example, a mobile phone (or referred to as a "cell" phone) that supports a WiFi communication function or a computer that has a wireless communication function. For example, the station may be a portable, pocket-sized, handheld, computer built-in, wearable, or in-vehicle wireless communications apparatus that supports a WiFi communication function, which exchanges communication data such as voice and data with a radio access network.

The 802.11 standard mainly includes two channel measurement technologies: (1) One is explicit channel measurement: A transmit end sends a training sequence to a receive end, and the receive end measures a channel from the transmit end to the receive end by using the training sequence, and feeds back channel measurement information to the transmit end. (2) The other is implicit channel measurement: A receive end sends a training sequence to a transmit end, and the transmit end measures a channel from the receive end to the transmit end by using the training sequence, and then obtains a channel from the transmit end to the receive end through channel reciprocity. In implicit channel measurement, correction needs to be performed by the transmit end and the receive end, and the process is relatively complex; therefore, in the 802.11ac standard, a channel measurement method is based on explicit channel measurement.

Figure 1:
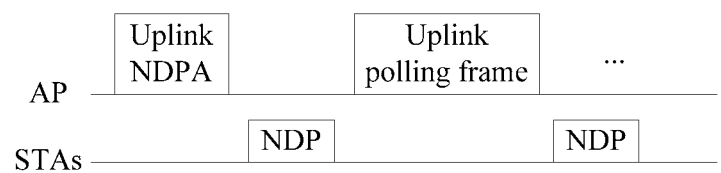
FIG. 1 is a schematic flowchart of uplink multi-user channel measurement in the prior art.
Figure 2A:
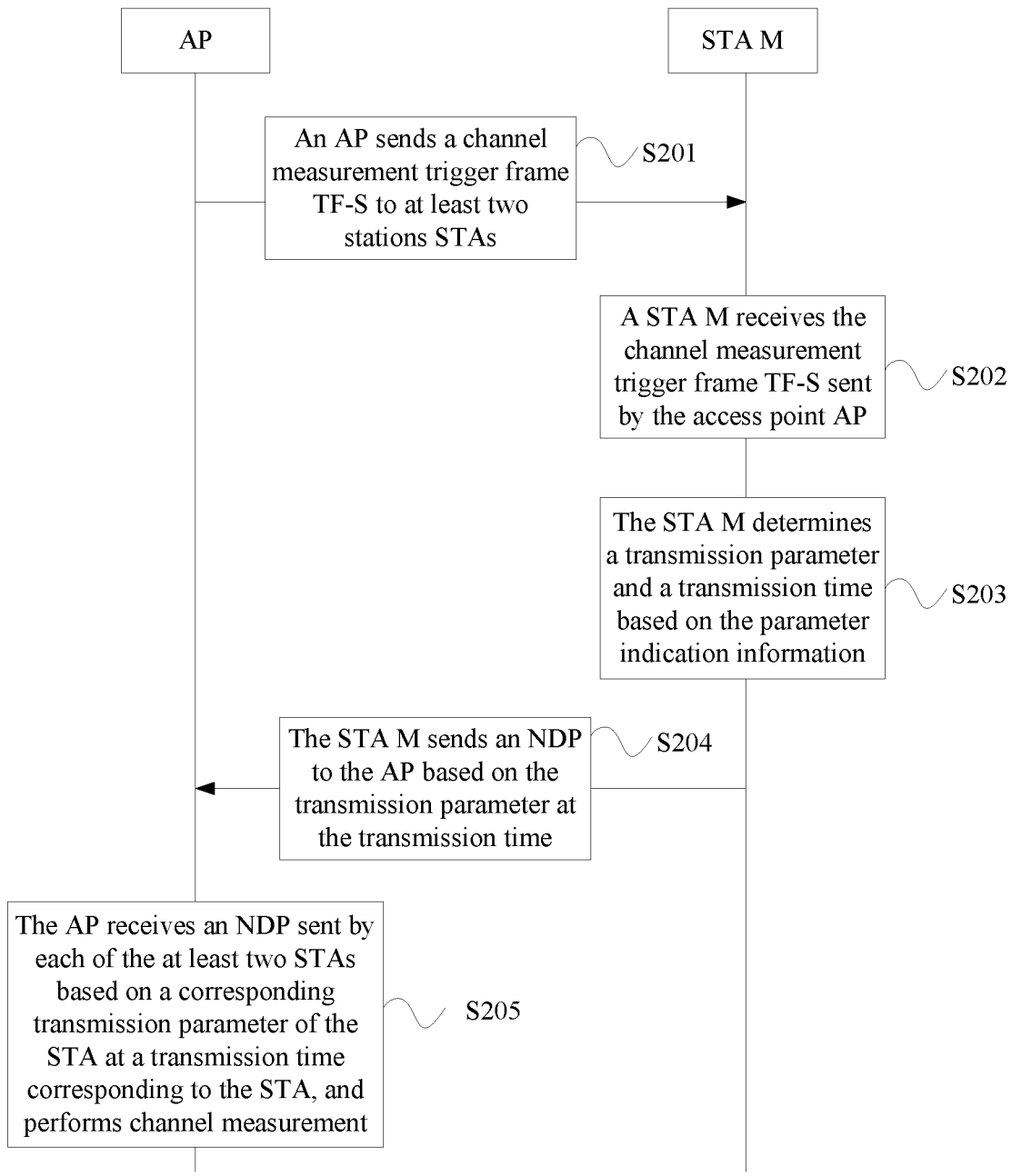
FIG. 2A is a schematic flowchart of Embodiment 1 of a channel measurement method according to the present invention.

FIG. 2A is a schematic flowchart of Embodiment 1 of a channel measurement method according to the present invention. As shown in FIG. 2A, the method in this embodiment may include the following steps.

S201. An access point AP sends a channel measurement trigger frame TF-S to at least two stations STAs.

FIG. 2B is a schematic diagram of an application scenario according to the present invention. As shown in FIG. 2B, during uplink multi-user channel measurement, the access point AP sends the channel measurement trigger frame TF-S to the at least two stations STAs (for example, N STAs, where N is a positive integer) simultaneously. The TF-S is used to trigger the at least two STAs to send null data packets NDPs used for uplink channel measurement. The TF-S includes parameter indication information of a transmission parameter used by each STA to send the NDP, and the parameter indication information is used by the STA to determine the transmission parameter and a transmission time. Optionally, the parameter indication information of the transmission parameter used by each STA to send the NDP includes one of or any combination of the following information: an association identifier (Association Identifier, AID) of the STA, spatial flow indication information of the STA, and channel resource unit RU indication information used by the STA to send the NDP. The AID of the STA is used to indicate that the STA needs to send the NDP to the AP. The spatial flow indication information of the STA includes indication information used by the STA to send a training sequence part of the NDP to the AP. Optionally, the spatial flow indication information includes spatial flow quantity $N_{ss}$ indication information of the STA (in this case, a spatial flow location is recorded as a default start location), or the spatial flow indication information includes spatial flow quantity $N_{ss}$ indication information and spatial flow location indication information of the STA. Optionally, a frame structure of the TF-S may be a trigger frame structure in 802.11ax. As shown in FIG. 2C (FIG. 2C is a schematic diagram of a frame structure of the TF-S), the frame structure of the TF-S includes a common signaling field and N STA signaling fields (for example, a STA 1 signaling field, a STA 2 signaling field, ..., and a STA N signaling field). Optionally, the common signaling field of the TF-S includes type indication information, and the type indication information is used to indicate that a trigger frame type is a TF-S. Optionally, the AP sends the TF-S to the at least two STAs simultaneously on at least a primary preset-bandwidth channel. No limitation is imposed on whether a TF-S is sent on another channel or how to send a TF-S. For example, if a transmission bandwidth is 80 MHz, the AP may send a TF-S on an entire 80 MHz channel, or may send a TF-S on a primary 20 MHz channel, copy the TF-S to other three 20 MHz channels separately, and send the TF-S.

Figure 2G:
FIG. 2G is schematic format diagram 4 of a STA M signaling field.

Optionally, at least one type of information in the parameter indication information of the transmission parameter used by each STA to send the NDP may be carried in the common signaling field of the TF-S, or may be carried in each STA signaling field of the TF-S. For example, the following several implementations may be used for the TF-S to carry parameter indication information of a transmission parameter used by a STA M (1≤M≤N) to send the NDP. Detailed descriptions are provided by using an example in which the parameter indication information of the transmission parameter used by the STA M to send the NDP includes an AID of the STA M, spatial flow indication information of the STA M, and $RU_M$ indication information used by the STA M to send the NDP: (1) First carrying manner: FIG. 2D is schematic format diagram 1 of a STA M signaling field; and as shown in FIG. 2D, all the parameter indication information of the transmission parameter used by the STA M to send the NDP may be carried in the STA M signaling field of the TF-S. (2) Second carrying manner: FIG. 2E is schematic format diagram 2 of a STA M signaling field; as shown in FIG. 2E, the STA M signaling field of the TF-S carries the AID of the STA M, and the spatial flow indication information and other information of the STA M, and the $RU_M$ indication information used by the STA M to send the NDP is carried in the common signaling field of the TF-S. (3) Third carrying manner: FIG. 2F is schematic format diagram 3 of a STA M signaling field; as shown in FIG. 2F, the STA M signaling field of the TF-S carries the AID of the STA M, the $RU_M$ indication information used by the STA M to send the NDP, and other information, and the spatial flow indication information of the STA M is carried in the common signaling field of the TF-S. (4) Fourth carrying manner: FIG. 2G is schematic format diagram 4 of a STA M signaling field; as shown in FIG. 2G the STA M signaling field of the TF-S carries the AID and other information of the STA M, and both the spatial flow indication information of the STA M and the $RU_M$ indication information used by the STA M to send the NDP are carried in the common signaling field of the TF-S.

Optionally, before the AP sends the channel measurement trigger frame TF-S to the at least two STAs, the method further includes: determining RUs (for example, $RU_1$, $RU_2$, ..., $RU_N$) used by all of the STAs and spatial flows of all the STAs. Each RU may be an RU including a specific quantity of subcarriers (for example, 26, 52, 106, 242, 484, or 996).

S202. A station STA M receives the channel measurement trigger frame TF-S sent by the access point AP.

In this step, the STA M (that is, a first STA) receives the TF-S sent by the AP, and the TF-S is used to trigger the at least two STAs (the STA M is included in the at least two STAs) to send, to the AP, null data packets NDPs used for uplink channel measurement. For details about an implementation in which the TF-S carries the parameter indication information of the transmission parameter used by the STA M (1≤M≤N) to send the NDP, refer to FIG. 2D to FIG. 2G; and details are not repeated herein. Optionally, the STA receives, on at least a primary preset-bandwidth channel (for example, a primary 20 MHz channel), the TF-S sent by the AP.

S203. The STA M determines a transmission parameter and a transmission time based on the parameter indication information.

In this step, the STA M determines the transmission parameter based on the parameter indication information, carried in the TF-S, of the transmission parameter used by the STA M to send the NDP, for example, an AID of the STA M, a spatial flow quantity NSSM and a spatial flow location of the STA M, and $RU_M$ used by the STA M to send the NDP. Further, the STA M automatically determines, based on parameter indication information of a transmission parameter used by a STA P (1≤P≤M) to send the NDP, a transmission time at which the NDP is sent (optionally, the STA M determines information such as a spatial flow quantity $N_{ssP}$ of the STA P based on the parameter indication information corresponding to the STA P, and determines, based on the information such as $N_{ssP}$, the transmission time at which the NDP is sent. The STA P is a STA whose signaling field is in front of the STA M signaling field of signaling fields of the TF-S), to ensure that there is no interframe gap between the NDP sent by the STA M and an NDP sent by any STA adjacent to the STA M (for example, a STA M−1 or a STA M+1). Optionally, the NDP includes a common preamble part and a training sequence part, or the NDP includes only a training sequence part. The STA P signaling field of the signaling fields of the TF-S is in front of the STA M signaling field.

S204. The STA M sends an NDP to the AP based on the transmission parameter at the transmission time.

In this embodiment, the transmission time is a time automatically determined by the STA M based on the parameter indication information corresponding to the STA P (1≤P≤M), and it is ensured that there is no interframe gap between the NDP sent by the STA M and an NDP sent by any STA adjacent to the STA M (for example, a STA M−1 or a STA M+1). Therefore, in this embodiment of the present invention, the AP does not need to send a polling frame to the STA M, and the STA M automatically sends the NDP frame to the AP based on the transmission parameter at the transmission time.

Figure 2H:
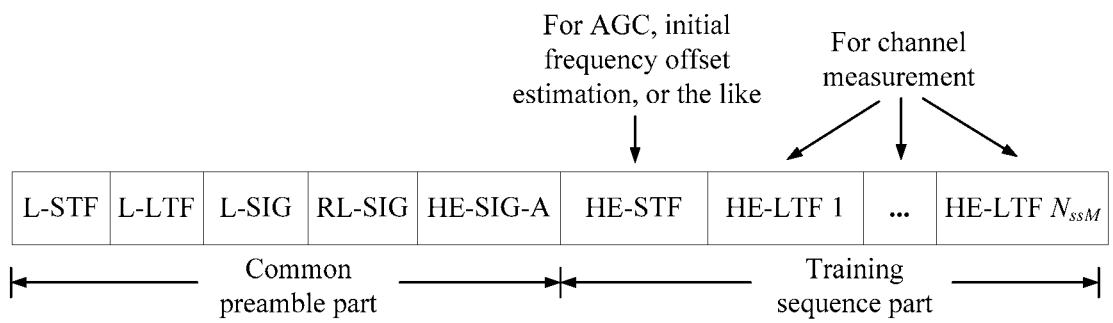
FIG. 2H is schematic diagram 1 of an NDP frame structure.
Figure 2I:
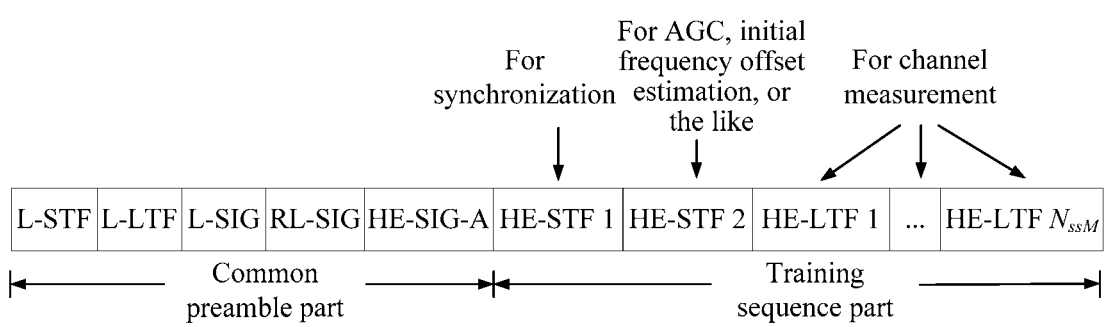
FIG. 2I is schematic diagram 2 of an NDP frame structure.

Optionally, a frame structure of the NDP may be based on an NDP frame structure in 802.11ax. (1) When the NDP frame includes a common preamble part and a training sequence part, as shown in FIG. 2H (FIG. 2H is schematic diagram 1 of an NDP frame structure), the common preamble part includes a legacy short training field L-STF, a legacy long training field L-LTF, a legacy signaling field L-SIG, a repeated legacy signaling field RL-SIG and a signaling field A (for example, HE-SIG-A), and the training sequence part includes a first short training field (for example, HE-STF) and $N_{ssM}$ long training fields (for example, HE-LTF 1, ..., and HE-LTF $N_{ssM}$) The first short training field is used by the AP to perform automatic gain control (Automatic Gain Control, AGC for short), initial frequency offset estimation, and/or the like, and the $N_{ssM}$ long training fields are used by the AP to perform channel measurement. Optionally, the training sequence part further includes a second short training field (for example, HE-STF 1, and correspondingly, the first short training field may be HE-STF 2) used for synchronization between the AP and the STA, as shown in FIG. 2I (FIG. 2I is schematic diagram 2 of an NDP frame structure).

Figure 2J:
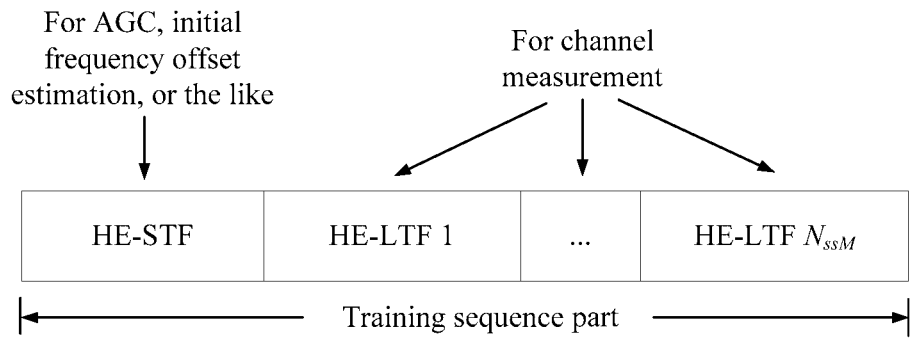
FIG. 2J is schematic diagram 3 of an NDP frame structure.
Figure 2K:
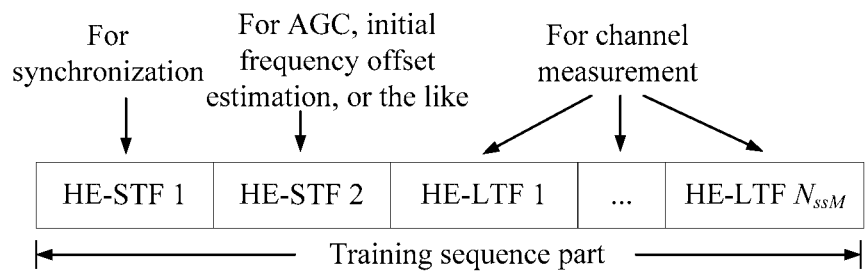
FIG. 2K is schematic diagram 4 of an NDP frame structure.

(2) When the NDP frame includes only a training sequence part, as shown in FIG. 2J (FIG. 2J is schematic diagram 3 of an NDP frame structure), the training sequence part includes a first short training field (for example, HE-STF) and $N_{ssM}$ long training fields (for example, HE-LTF 1, ..., and HE-LTF $N_{ssM}$) Optionally, the training sequence part further includes a second short training field (for example, HE-STF 1, and correspondingly, the first short training field may be HE-STF 2) used for synchronization between the AP and the STA, as shown in FIG. 2K (FIG. 2K is schematic diagram 4 of an NDP frame structure).

S205. The AP receives an NDP sent by each of the at least two STAs based on a corresponding transmission parameter of the STA at a transmission time corresponding to the STA, and performs channel measurement.

There is no interframe gap between NDPs sent by any two adjacent STAs of the at least two STAs.

In this step, the AP receives the NDP sent by each of the at least two STAs based on a corresponding transmission parameter of the STA at a transmission time corresponding to the STA (that is, there is no interframe gap between NDPs sent by all adjacent STAs), and measures a channel between each STA and the AP based on the training sequence part of each of the NDPs. For example, the AP receives the NDP sent by the STA M based on the corresponding transmission parameter of the STA M (for example, a spatial flow quantity $N_{ssM}$ and a spatial flow location of the STA M and $RU_M$ used by the STA M to send the NDP) at the transmission time determined by the STA M, and measures a channel between the STA M and the AP based on the training sequence part of the NDP. Optionally, for details about how to perform channel measurement based on the training sequence part, refer to a prior-art manner, and details are not described herein. It can be learned that in this embodiment of the present invention, the AP does not need to send polling frames to the at least two STAs in sequence after sending the TF-S to the at least two STAs simultaneously, the at least two STAs automatically determine respective transmission times for sending NDPs, and send the NDPs to the AP at corresponding transmission times, and there is no interframe gap between NDPs sent by any two adjacent STAs of the at least two STAs. In this way, a time required for channel measurement is shortened, and channel measurement efficiency is improved.

Optionally, when the training part includes the first short training field, the AP performs AGC, initial frequency offset estimation, and/or the like based on the first short training field before measuring the channel between each STA and the AP based on the training sequence part of each of the cascaded NDPs. When the training part includes the first short training field and the second short training field, before measuring the channel between each STA and the AP based on the training sequence part of each of the cascaded NDPs, the AP synchronizes with the STA based on the second short training field, and performs AGC, initial frequency offset estimation, and/or the like based on the first short training field.

In this embodiment, the access point AP sends the channel measurement trigger frame TF-S to the at least two stations STAs. The TF-S includes the parameter indication information of the transmission parameter used by each STA to send the NDP. Further, each STA determines a respective transmission parameter and transmission time based on the parameter indication information, carried in the TF-S, of the transmission parameter used by the STA to send the NDP, and sends the NDP to the AP based on the corresponding transmission parameter at the respective transmission time. Further, the AP receives the NDPs sent by the at least two STAs (there is no interframe gap between NDPs sent by all adjacent STAs), and performs channel measurement. It can be learned that, compared with the prior art in which a STA sends an NDP to an AP after receiving a polling frame, in this embodiment of the present invention, after the AP sends the TF-S to the at least two STAs simultaneously, each STA automatically determines the respective transmission time at which the NDP is sent and automatically sends the NDP to the AP at the corresponding transmission time. In this way, a time required for channel measurement is shortened, and channel measurement efficiency is improved.

Optionally, this embodiment of the present invention may be applied to a wireless local area network, for example, a WiFi system represented by 802.11a, 802.11b, 802.11g, 802.11n, 802.11ac, or the like, or may be applied to a next-generation WiFi system or a next-generation wireless local area network system. This is not limited in the present invention.

Based on the foregoing embodiment, optionally, the TF-S further includes a carrier sense indication corresponding to each STA (for example, the STA M). The carrier sense indication is used to indicate whether the STA needs to perform carrier sense. If the carrier sense indication indicates that the STA (for example, the STA M) does not need to perform carrier sense, the STA (for example, the STA M) directly sends the NDP to the AP; or if the carrier sense indication indicates that the STA (for example, the STA M) needs to perform carrier sense, the STA (for example, the STA M) may perform carrier sense (or certainly, may not perform carrier sense, and the STA determines whether to perform carrier sense) before sending the NDP to the AP. (1) Optionally, the TF-S includes one carrier sense indication. The carrier sense indication is used to indicate whether each STA needs to perform carrier sense. Optionally, the carrier sense indication may be carried in the common signaling field of the TF-S. (2) Optionally, the TF-S includes a carrier sense indication corresponding to each STA (for example, the STA M). The carrier sense indication corresponding to each STA is used to indicate whether the corresponding STA needs to perform carrier sense. Optionally, the carrier sense indication corresponding to each STA may be carried in the common signaling field of the TF-S, or may be carried in a corresponding STA signaling field of the TF-S. Optionally, the carrier sense includes physical carrier sense and virtual carrier sense. (1) Physical carrier sense indicates that a user (including an AP or a STA) needs to detect, before sending information, whether a to-be-sent channel is idle. If the user detects that a signal on the channel is a WiFi signal and a power of the signal is less than a first threshold (for example, −82 dBm), or detects that there is a non-WiFi signal on the channel and a power of the signal is less than a second threshold (for example, −62 dBm), it is considered that the to-be-sent channel is idle; otherwise, it is considered that the to-be-sent channel is busy. (2) Virtual carrier sense is enhancement of physical carrier sense. A core concept of virtual carrier sense is that a user sets a NAV (the NAV is a timer). When the user receives a signal from another user, to protect information exchange with the another user, the user sets its own NAV based on duration (duration) information included in the received signal from the another user (for example, sets NAV=duration). The NAV decreases along with time. Before the NAV decreases to 0, the user considers that the current channel is busy. Therefore, during carrier sense, the user determines the current channel as idle only when both physical carrier sense and virtual carrier sense indicate that the channel is in an idle state.

Correspondingly, before the STA M sends the NDP to the AP based on the transmission parameter at the transmission time in step 204, the method further includes:

determining, by the STA M based on the carrier sense indication, whether to perform carrier sense.

That the STA M sends an NDP to the AP based on the transmission parameter at the transmission time includes:

when the STA determines that carrier sense does not need to be performed, or determines that carrier sense needs to be performed and a sense result is that the channel is idle, sending, by the STA M, the NDP to the AP based on the transmission parameter at the transmission time.

In this embodiment, the STA M determines, based on the carrier sense indication, whether to perform carrier sense. (1) If the carrier sense indication indicates that the STA M does not need to perform carrier sense, that is, the STA M determines that carrier sense does not need to be performed, the STA M directly sends the NDP to the AP based on the transmission parameter at the transmission time. (2) If the carrier sense indication indicates that the STA M needs to perform carrier sense, the STA M may perform carrier sense (or certainly, may not perform carrier sense, and the STA M determines whether to perform carrier sense) before sending the NDP to the AP. (2a) When the STA M determines to perform carrier sense and determines that a carrier sense result is that the channel is idle, the STA M sends the NDP to the AP based on the transmission parameter at the transmission time. (2b) When the STA M determines to perform carrier sense and a carrier sense result is that the channel is busy, the STA M does not send the NDP to the AP. (2c) When the STA M determines that carrier sense does not need to be performed (a channel status does not need to be considered), the STA M directly sends the NDP to the AP based on the transmission parameter at the transmission time. It can be learned that the STA M may determine, based on the carrier sense indication, whether to perform carrier sense, instead of performing carrier sense each time before sending the NDP. This further shortens a time required for channel measurement, and improves channel measurement efficiency.

In Embodiment 2 of a channel measurement method in the present invention, based on the foregoing embodiment, in step S203, the STA M determines, based on the parameter indication information corresponding to the STA M, a spatial flow quantity $N_{ssM}$ and a spatial flow location of the STA M, and $RU_M$ used by the STA M to send the NDP (optionally, the NDP includes only a training sequence part). Further, the STA M determines a first transmission time $T_M$ based on parameter indication information corresponding to a second STA. The second STA M is a STA whose signaling field is in front of a signaling field of the first STA in the signaling fields of the TF-S, for example, a STA P ($1 \leq P \leq M$). The first transmission time $T_M$ is a transmission time at which the STA M sends the NDP (that is, a time at which the STA M sends the training sequence part). Optionally, the STA M determines information such as a spatial flow quantity $N_{ssP}$ of the STA P based on the parameter indication information corresponding to the STA P, and determines the first transmission time $T_M$ based on the information such as the spatial flow quantity $N_{ssP}$.

If a time point at which the STA M receives the TF-S is $T_0$ (that is, a time point at which each STA receives the TF-S is $T_0$), duration of a first short training field is recorded as $\Delta T_s$, and duration of each long training field is recorded as $\Delta T_L$, the first transmission time $T_M$ at which the STA M sends the NDP may be determined according to formula 1. Formula 1 is $T_M = T_0 + \text{xIFS} + (M-1)\Delta T_s + (N_{ss1} + N_{ss2} + \ldots + N_{ss\ M-1})\Delta T_L$, where xIFS is a preset time interval, for example, it may be met that xIFS=SIFS=16 μs. Optionally, in the foregoing formula, calculation is performed by using the NDP frame structure in FIG. 2J as an example. If calculation is performed by using the NDP frame structure in FIG. 2K as an example (duration of a second short training field is recorded as $\Delta T_s$), the first transmission time $T_M$ at which the STA M sends the NDP may be determined according to formula 2. Formula 2 is:

$$T_M = T_0 + \text{xIFS} + 2(M-1)\Delta T_s + (N_{ss1} + N_{ss2} + \ldots + N_{ss\ M-1})\Delta T_L.$$

Correspondingly, in step S204, the STA M sends the NDP to the AP at the time point $T_M$ by using $RU_M$. There is no interframe gap between the NDP and an NDP sent by a STA adjacent to the STA M (for example, a STA M−1 or a STA M+1).

Figure 3A:
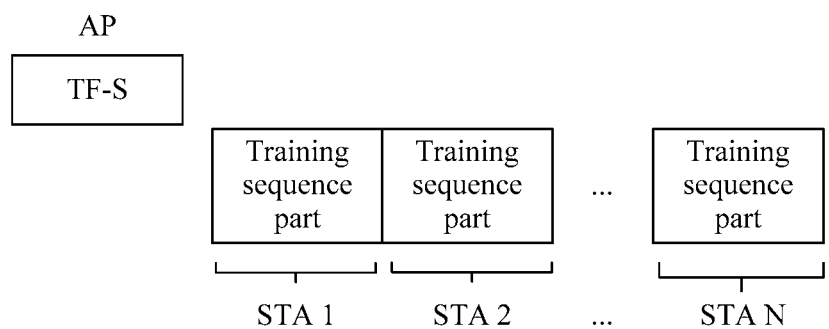
FIG. 3A is schematic diagram 1 of uplink multi-user channel measurement.
Figure 3B:
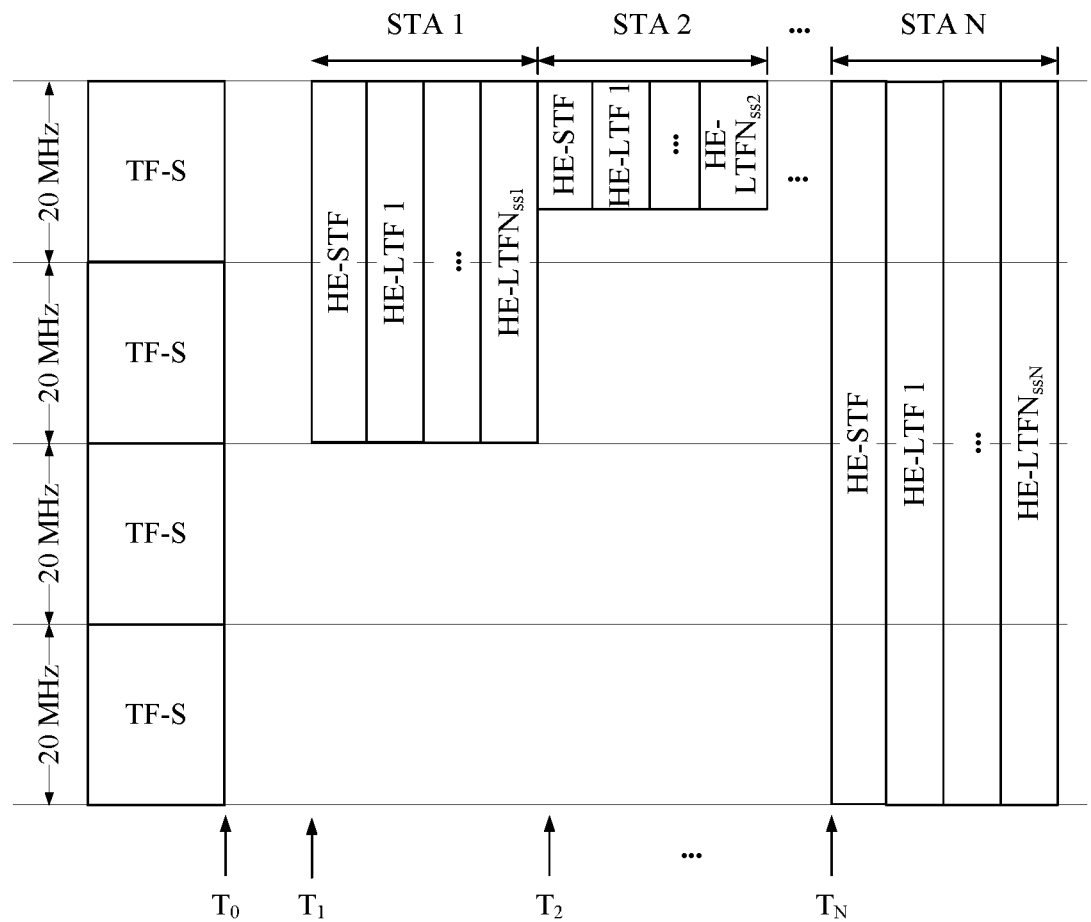
FIG. 3B is schematic diagram 2 of uplink multi-user channel measurement.

Correspondingly, in step 5205, the AP receives NDPs that include only training sequence parts and that are sent in sequence by all of the STAs at corresponding first transmission times (for example, a time point $T_M$ the STA M) by using corresponding transmission parameters (for example, $RU_M$ for the STA M). There is no interframe gap between NDPs sent by any two adjacent STAs, as shown in FIG. 3A and FIG. 3B (FIG. 3A is schematic diagram 1 of uplink multi-user channel measurement, and FIG. 3B is schematic diagram 2 of uplink multi-user channel measurement). It can be learned that, compared with the prior art in which a STA sends an NDP to an AP after receiving a polling frame, in this embodiment of the present invention, each STA automatically determines a respective transmission time after receiving the TF-S, and automatically sends the NDP at the corresponding transmission time. In this way, a time required for channel measurement is greatly shortened, and channel measurement efficiency is improved.

In Embodiment 3 of a channel measurement method in the present invention, based on the foregoing embodiment, in step 5203, the STA M determines, based on the parameter indication information corresponding to the STA M, a spatial flow quantity $N_{ssM}$ and a spatial flow location of the STA M, and $RU_M$ used by the STA M to send the NDP (optionally, the NDP includes a common preamble part and a training sequence part). Further, the STA M determines a first transmission time $T_M$ on parameter indication information corresponding to a STA P ($1 \leq P \leq M$). The first transmission time $T_M$ includes a second transmission time $T_{M1}$ at which the STA M sends the common preamble part of the NDP and a third transmission time $T_{M2}$ at which the STA M sends the training sequence part of the NDP. Optionally, the STA M determines information such as a spatial flow quantity $N_{ssP}$ of the STA P based on the parameter indication information corresponding to the STA P, and determines the first transmission time $T_M$ based on the information such as the spatial flow quantity $N_{ssP}$.

If a time point at which the STA M receives the TF-S is $T_0$ (that is, a time point at which each STA receives a TF-S is $T_0$), duration of each common preamble part is recorded as $\Delta T_A$, duration of each first short training field is recorded as $\Delta T_s$, and duration of each long training field is recorded as $\Delta T_L$, the first transmission time $T_M$ ($T_{M1} = T_M$, $T_{M2} = T_M + \Delta T_A$) at which the STA M sends the NDP may be determined according to $T_M = T_0 + \text{xIFS} + (M-1)\Delta T_A + (M-1)\Delta T_s + (N_{ss1} + N_{ss2} + \ldots + N_{ss\ M-1})\Delta T_L$ (formula 3), where xIFS is a preset time interval, for example, it may be met that xIFS=SIFS=16 μs. Optionally, in the foregoing formula, calculation is performed by using the NDP frame structure in FIG. 2H as an example. If calculation is performed by using the NDP frame structure in FIG. 2I as an example (duration of a second short training field is recorded as $\Delta T_s$), the first transmission time $T_M$ at which the STA M sends the NDP may be determined according to formula 4. Formula 4 is:

$$T_M = T_0 + \text{xIFS} + (M-1)\Delta T_A + 2(M-1)\Delta T_s + (N_{ss1} + N_{ss2} + \ldots + N_{ss\ M-1})\Delta T_L.$$

Figure 4A:
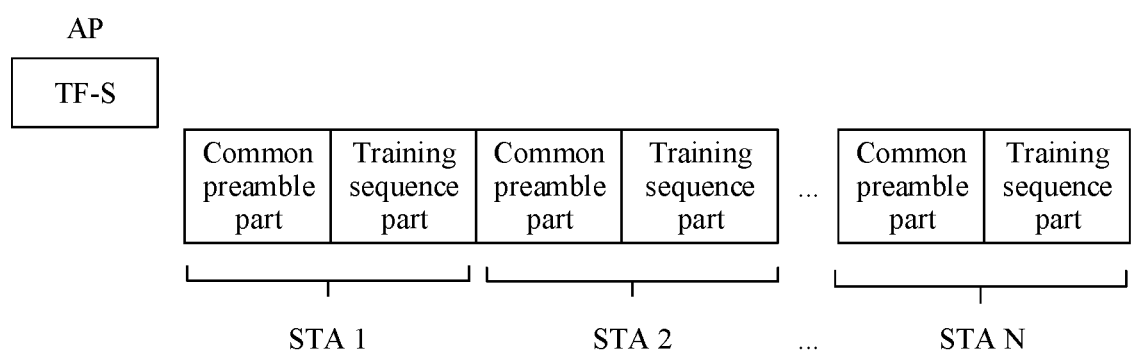
FIG. 4A is schematic diagram 3 of uplink multi-user channel measurement.
Figure 4B:
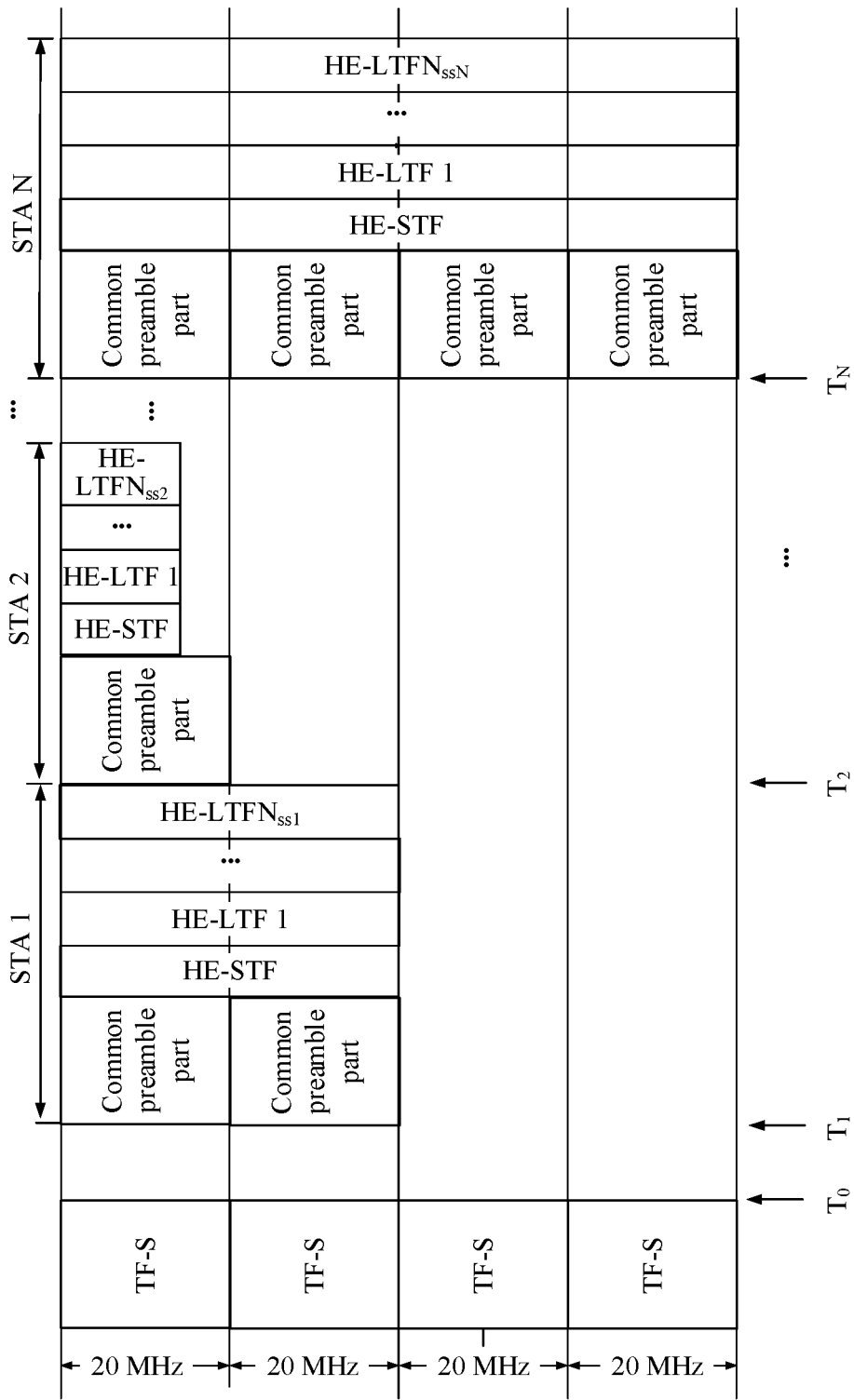
FIG. 4B is schematic diagram 4 of uplink multi-user channel measurement.

Correspondingly, in step S204, the STA M sends the common preamble part of the NDP to the AP at the second transmission time $T_{M1}$ in at least a bandwidth occupied by the $RU_M$ (for example, as shown in FIG. 4B, a channel that needs to be measured by a STA 2 is a half of the 1st 20 MHz bandwidth, and the STA 2 needs to send the common preamble part in the 1st 20 MHz bandwidth), and sends the training sequence part of the NDP to the AP at the third transmission time $T_{M2}$ by using the $RU_M$ (as shown in FIG. 4B, a channel that needs to be measured by the STA 2 is a half of the $1^{st}$ 20 MHz bandwidth, and the STA 2 sends the training sequence part at the channel half of the $1^{st}$ 20 MHz bandwidth). There is no interframe gap between the NDP and an NDP sent by a STA adjacent to the STA M (for example, a STA M−1 or a STA M+1).

Correspondingly, in step S205, the AP receives NDPs that include common preamble parts and training sequence parts and that are sent in sequence by all of the STAs at corresponding first transmission times (for example, a time point $T_M$ for the STA M) by using corresponding transmission parameters (for example, $RU_M$ for the STA M). There is no interframe gap between NDPs sent by any two adjacent STAs, as shown in FIG. 4A and FIG. 4B (FIG. 4A is schematic diagram 3 of uplink multi-user channel measurement, and FIG. 4B is schematic diagram 4 of uplink multi-user channel measurement). In this way, a time required for channel measurement is shortened, and channel measurement efficiency is improved.

In Embodiment 4 of a channel measurement method in the present invention, based on the foregoing embodiment, in step S203, the STA M determines, based on the parameter indication information corresponding to the STA M, a spatial flow quantity $N_{ssM}$ and a spatial flow location of the STA M, and $RU_M$ used by the STA M to send the NDP (optionally, the NDP includes a common preamble part and a training sequence part). Further, the STA M determines a fourth transmission time $T_c$ and a fifth transmission time $T_M$ based on parameter indication information corresponding to a STA P ($1 \le P \le M$). The fourth transmission time $T_c$ is a transmission time at which the STA M sends the common preamble part of the NDP, and the fifth transmission time $T_M$ is a transmission time at which the STA M sends the training sequence part of the NDP. Optionally, the STA M determines information such as a spatial flow quantity $N_{ssP}$ of the STA P based on the parameter indication information corresponding to the STA P, and determines the fourth transmission time $T_c$ and the fifth transmission time $T_M$ based on the information such as the spatial flow quantity $N_{ssP}$.

It is assumed that a time point at which the STA M receives the TF-S is $T_0$ (that is, a time point at which each STA receives the TF-S is $T_0$); a fourth transmission time $T_c$ at which all of the STAs send the common preamble parts simultaneously are recorded as $T_c = T_0 + xIFS$, where xIFS is a preset time interval, for example, it may be met that xIFS=SIFS=16 μs; and duration of each common preamble part is $\Delta T_A$, duration of each first short training field is $\Delta T_s$, and duration of each long training field is $\Delta T_L$. In this case, the fifth transmission time $T_M$ at which the STA M sends the training sequence part may be determined according to formula 5. Formula 5 is $T_M = T_c + \Delta T_A + (M-1)\Delta T_s + (N_{ss1} + N_{ss2} + \ldots + N_{ss\ M-1})\Delta T_L$. Optionally, in the foregoing formula, calculation is performed by using the NDP frame structure in FIG. 2H as an example. If calculation is performed by using the NDP frame structure in FIG. 2I as an example (duration of a second short training field is recorded as $\Delta T_s$), the fifth transmission time $T_M$ at which the STA M sends the training sequence part may be determined according to formula 6. Formula 6 is:

$$T_M = T_c + \Delta T_A + 2(M-1)\Delta T_s + (N_{ss1} + N_{ss2} + \ldots + N_{ss\ M-1})\Delta T_L.$$

Correspondingly, in step S204, the STA M sends the common preamble part of the NDP to the AP at the fourth transmission time $T_c$ in at least a bandwidth occupied by the $RU_M$, and sends the training sequence part of the NDP to the AP at the fifth transmission time $T_M$ by using the $RU_M$. There is no interframe gap between the NDP and a training sequence part sent by a STA adjacent to the STA M (for example, a STA M−1 or a STA M+1). There is no interframe gap between the common preamble part of the NDP and a training sequence part sent by a STA 1 (that is, the $1^{st}$ STA, optionally, the $1^{st}$ STA is a STA that is the first STA of the at least two STAs to send a training sequence part, or is a STA whose signaling field is located in the $1^{st}$ signaling field of the TF-S).

Figure 5A:
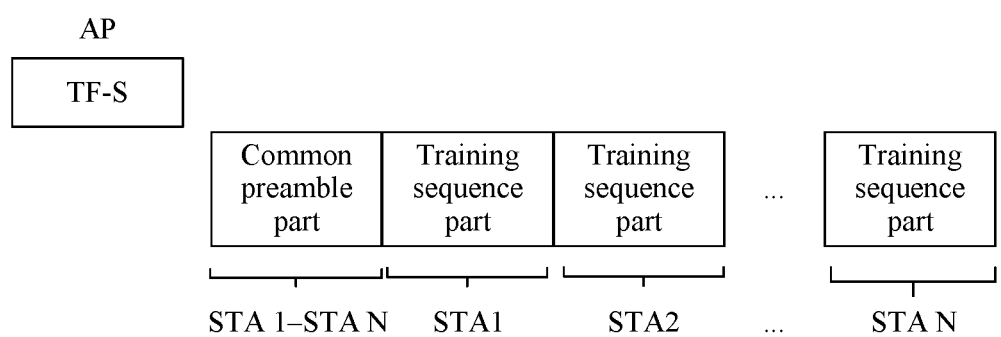
FIG. 5A is schematic diagram 5 of uplink multi-user channel measurement.
Figure 5B:
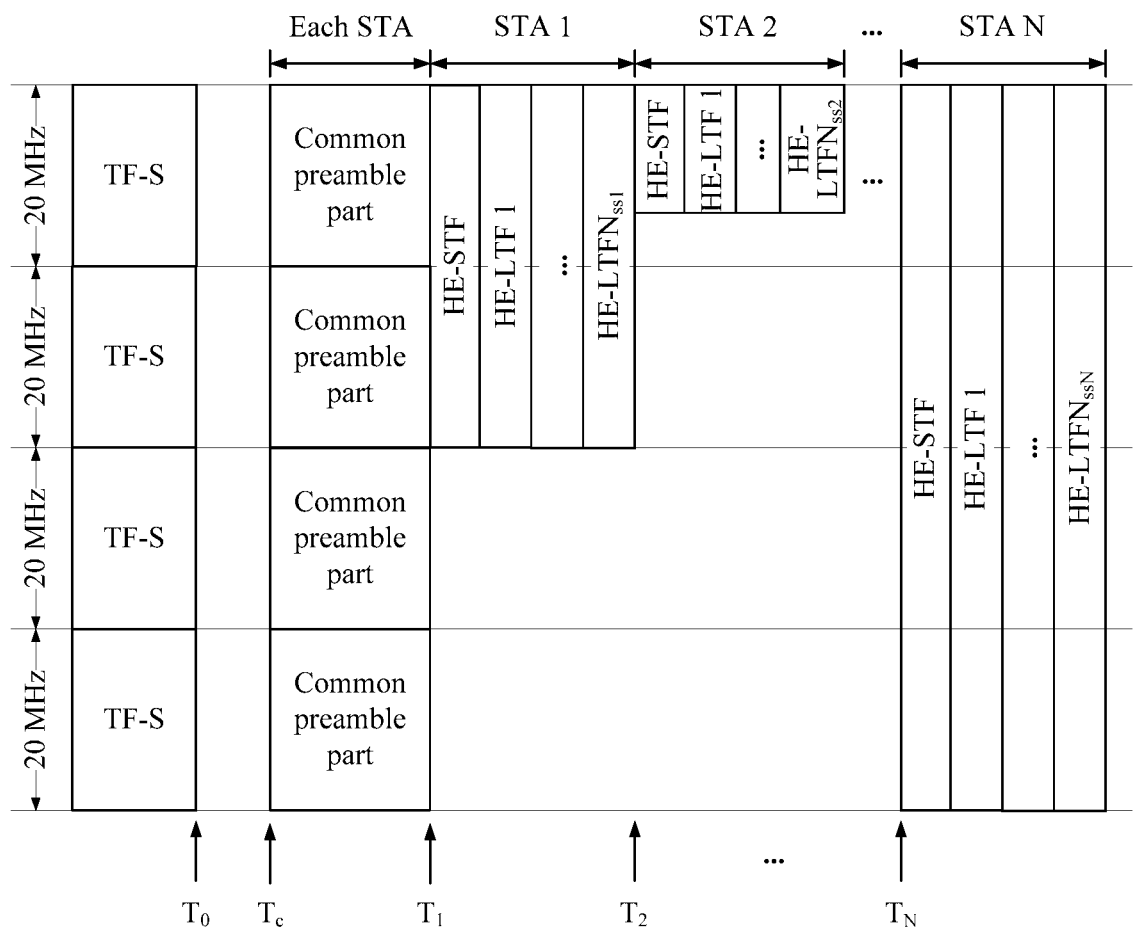
FIG. 5B is schematic diagram 6 of uplink multi-user channel measurement.

Correspondingly, in step S205, the AP receives common preamble parts of NDPs simultaneously sent by all of the STAs based on corresponding transmission parameters at a fourth transmission time $T_c$, and receives training sequence parts of the NDPs sent in sequence by all of the STAs at corresponding fifth transmission times (for example, a time point $T_M$ for the STA M) by using corresponding transmission parameters (for example, $RU_M$ for the STA M). There is no interframe gap between the common preamble part of the NDP and a training sequence part sent by a STA 1 (that is, the $1^{st}$ STA). There is no interframe gap between training sequence parts sent by any two adjacent STAs, as shown in FIG. 5A and FIG. 5B (FIG. 5A is schematic diagram 5 of uplink multi-user channel measurement, and FIG. 5B is schematic diagram 6 of uplink multi-user channel measurement). In this way, a time required for channel measurement is shortened, and channel measurement efficiency is improved.

Figure 6A:
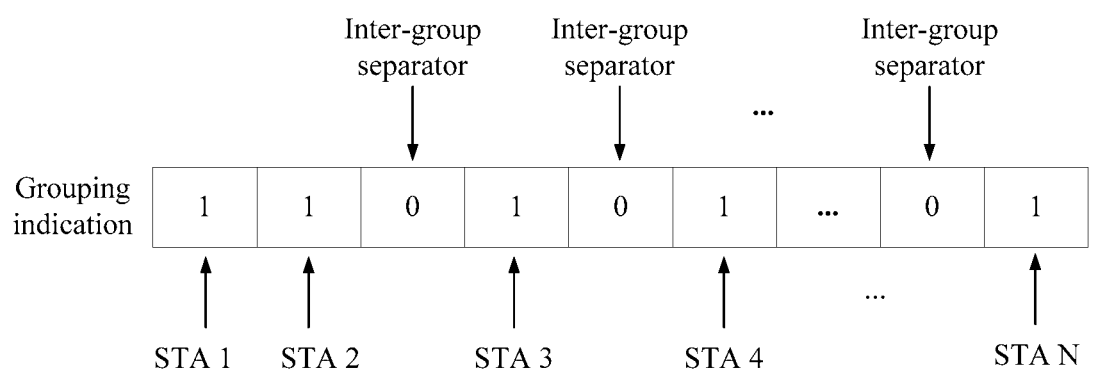
FIG. 6A is a schematic diagram of a STA grouping indication.

In Embodiment 5 of a channel measurement method in the present invention, based on the foregoing embodiment, the at least two STAs (for example, N STAs) are classified into at least two member groups. Types of the member groups include a multi-member group and/or a single-member group. The multi-member group includes at least two STAs. The single-member group includes one STA. Correspondingly, the TF-S further includes a grouping indication of each STA. Optionally, the grouping indication of each STA is carried in the common signaling field of the TF-S, or carried in each STA signaling field of the TF-S. For example, a grouping indication of the STA M may be carried in the common signaling field of the TF-S, or carried in a STA M signaling field of the TF-S. Optionally, a bit indication manner may be used for the grouping indication. All STAs belonging to the multi-member group transmit training sequence parts simultaneously by using uplink MU-MIMO, as shown in FIG. 6A (FIG. 6A is a schematic diagram of a STA grouping indication). For example, a STA 1 and a STA 2 are classified into a multi-member group, and the two STAs in the multi-member group send training sequence parts simultaneously to the AP in an uplink MU-MIMO transmission manner. Other STAs different from the STAs belonging to the multi-member group belong to corresponding single-member groups respectively, and all the STAs belonging to the single-member groups send respective training sequence parts in sequence at respective time points.

Correspondingly, in step S203, the STA M determines, based on the parameter indication information corresponding to the STA M, a spatial flow quantity $N_{ssM}$ and a spatial flow location of the STA M and $RU_M$ used by the STA M to send the NDP (optionally, the NDP includes only a training sequence part). Further, the STA M determines a first transmission time $T_M$ based on parameter indication information corresponding to a STA P (1≤P≤M) and the grouping indication (grouping statuses of the STA P and the STA M can be learned based on the grouping indication). The first transmission time is a transmission time at which the STA M sends the NDP (that is, the training sequence part). Optionally, the STA M determines a spatial flow quantity $N_{ssP}$ of the STA P based on the parameter indication information corresponding to the STA P, determines grouping statuses of the STA P and the STA M based on the grouping indication, and further determines the first transmission time $T_M$ based on the spatial flow quantity $N_{ssP}$ and the grouping statuses.

If N STAs are classified into several member groups, and sets of STA sequence numbers included in all member groups are recorded as Error! Objects cannot be created from editing field codes., the first transmission time $T_M$ at which the STA M (1≤M≤N) sends the training sequence part is determined according to formula 7. Formula 7 is:

$$T_M = T_0 + xIFS + G_1\Delta T_s + \left(\max_{i\in\phi_1}\{N_{ssi}\} + \max_{i\in\phi_2}\{N_{ssi}\} + \ldots + \max_{i\in\phi_{G_1}}\{N_{ssi}\}\right)\Delta T_L,$$

where $\phi_1, \phi_2, \ldots, \phi_{G_1}$ are member groups ($G_1 < G$) in front of the STA M, and as shown in FIG. 6A, $\phi_1 = \{1,2\}$, $\phi_2 = \{3\}$, $\phi_3 = \{4\}$, ..., $\phi_{N-1} = \{N\}$. (1) A first transmission times $T_1$ at which the STA 1 sends a training sequence part and a first transmission time $T_2$ at which the STA 2 sends a training sequence part are both $T_0 + xIFS$ (2) The first transmission time $T_M$ at which the STA M (2<M≤N) sends the training sequence part meets $$T_M = T_0 + xIFS + (M-2)\Delta T_S + \left(\max_{i\in[1,2]}\{N_{ssi}\}\right)\Delta T_L + (N_{ss3} + \ldots + N_{ssM-1})\Delta T_L.$$

Correspondingly, in step S204, the STA M determines, based on the grouping indication, a type of a member group to which the STA M belongs. The type of the member group includes one of the following types: a multi-member group or a single-member group. (1) If the STA M belongs to the multi-member group (for example, M is 1 or 2), the STA M sends the NDP to the AP at the first transmission time $T_M$ by using the $RU_M$ and a MU-MIMO technology. If the STA belongs to the single-member group (for example, 2<M≤N), the STA M sends the NDP to the AP at the first transmission time $T_M$ by using the $RU_M$. There is no interframe gap between the NDP and an NDP sent by a STA adjacent to the STA M (for example, a STA M−1 or a STA M+1).

Figure 6B:
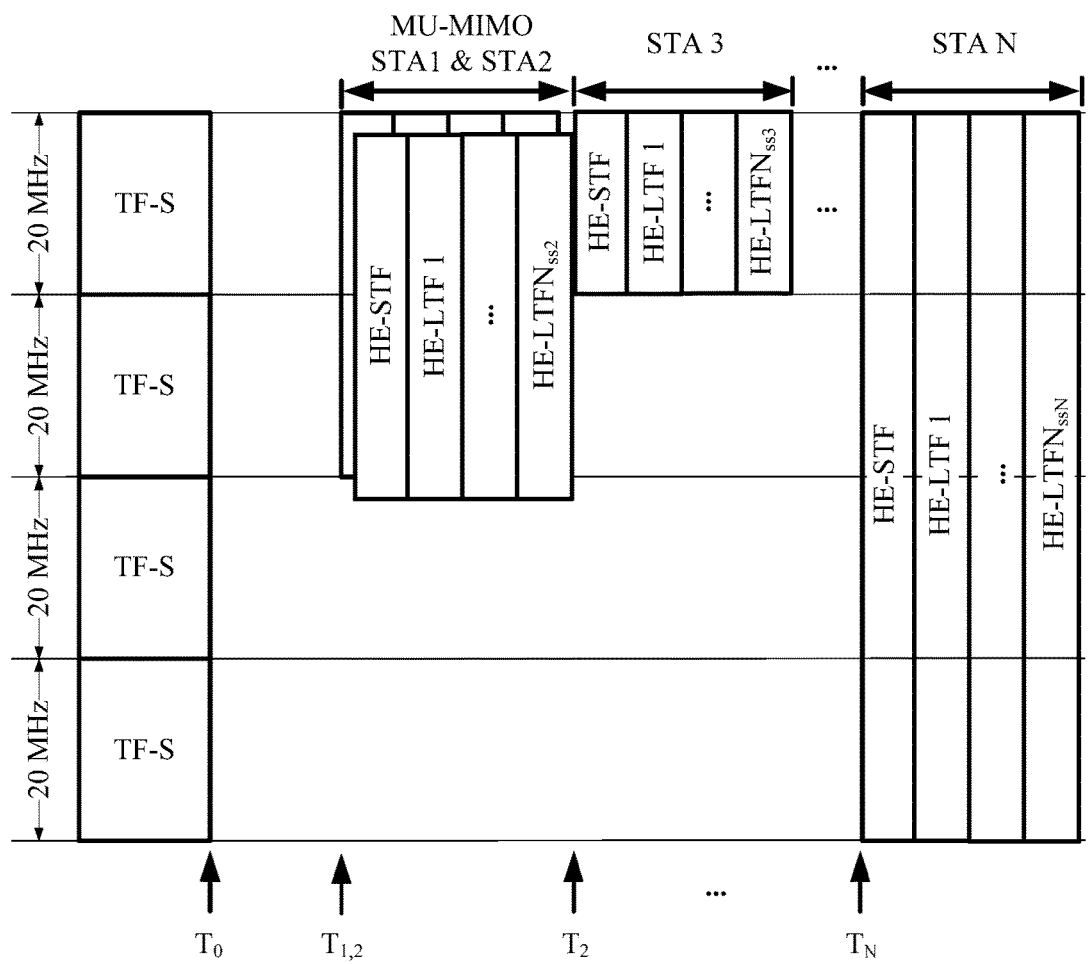
FIG. 6B is schematic diagram 7 of uplink multi-user channel measurement.

Correspondingly, in step S205, by using the MU-MIMO technology, the AP receives NDPs that include only training sequence parts and that are simultaneously sent based on corresponding transmission parameters at the first transmission time $T_M$ (for example, M is 1 or 2) by all STAs belonging to the multi-member group (for example, a STA 1 or a STA 2), and receives NDPs that include only training sequence parts and that are sent in sequence based on corresponding transmission parameters at corresponding first transmission times $T_M$ (for example, 2<M≤N) by the STA M (2<M≤N) belonging to the single-member group. There is no interframe gap between NDPs sent by any two adjacent STAs, as shown in FIG. 6B (FIG. 6B is schematic diagram 7 of uplink multi-user channel measurement). In this way, a time required for channel measurement is shortened, and channel measurement efficiency is improved.

In Embodiment 6 of a channel measurement method in the present invention, based on the foregoing embodiment, the at least two STAs (for example, N STAs) are classified into at least two member groups. Types of the member groups include a multi-member group and/or a single-member group. The multi-member group includes at least two STAs. The single-member group includes one STA. Correspondingly, the TF-S further includes a grouping indication of each STA. Optionally, the grouping indication of each STA is carried in the common signaling field of the TF-S, or carried in each STA signaling field of the TF-S. Optionally, a bit indication manner may be used for the grouping indication. All STAs belonging to the multi-member group send common preamble parts simultaneously to the AP, and transmit training sequence parts simultaneously by using uplink MU-MIMO. As shown in FIG. 6A, for example, a STA 1 and a STA 2 are classified into a multi-member group, the two STAs in the multi-member group send common preamble parts simultaneously to the AP, and send training sequence parts simultaneously to the AP in an uplink MU-MIMO transmission manner. Other STAs different from the STAs belonging to the multi-member group belong to corresponding single-member groups respectively, and all the STAs belonging to the single-member groups send respective NDPs (including common preamble parts and training sequence parts) in sequence at respective time points.

Correspondingly, in step 5203, the STA M determines, based on the parameter indication information corresponding to the STA M, a spatial flow quantity $N_{ssM}$ and a spatial flow location of the STA M and $RU_M$ used by the STA M to send the NDP (optionally, the NDP includes a common preamble part and a training sequence part). Further, the STA M determines a first transmission time $T_M$ based on parameter indication information corresponding to a STA P (1≤P<M) and the grouping indication (grouping statuses of the STA P and the STA M can be learned based on the grouping indication). The first transmission time $T_M$ includes a second transmission time $T_{M1}$ at which the STA M sends the common preamble part of the NDP and a third transmission time $T_{M2}$ at which the STA M sends the training sequence part of the NDP. Optionally, the STA M determines a spatial flow quantity $N_{ssP}$ of the STA P based on the parameter indication information corresponding to the STA P, determines grouping statuses of the STA P and the STA M based on the grouping indication, and further determines the first transmission time $N_{ssP}$ based on the spatial flow quantity $T_M$ and the grouping statuses.

If N STAs are classified into several member groups, and sets of STA sequence numbers included in all member groups are recorded as $\phi_1, \phi_2, \ldots, \phi_G$, the first transmission time $T_M$ ($T_{M1} = T_M$, and $T_{M2} = T_M + \Delta T_A$) at which the STA M (1≤M≤N) sends the NDP is determined according to formula 8. Formula 8 is:

$$T_M = T_0 + xIFS + G_1\Delta T_A + G_1\Delta T_s + \left(\max_{i\in\phi_1}\{N_{ssi}\} + \max_{i\in\phi_2}\{N_{ssi}\} + \ldots + \max_{i\in\phi_{G_1}}\{N_{ssi}\}\right)\Delta T_L,$$

where $\phi_1, \phi_2, \ldots, \phi_{G_1}$ are member groups ($G_1 < G$) in front of the STA M, and as shown in FIG. 6A, Error! Objects cannot be created from editing field codes.. (1) A second transmission time $T_{11}$ at which the STA 1 sends a common preamble part and a second transmission time $T_{21}$ at which the STA 2 sends a common preamble part are both $T_0+xIFS+\Delta T_A$, and a third transmission time $T_{12}$ at which the STA 1 sends a training sequence part and a third transmission time $T_{22}$ at which the STA 2 sends a training sequence part are both $T_0+xIFS+\Delta T_A$. (2) The second transmission time $T_{M1}$ at which the STA M (2<M≤N) sends the common preamble part meets:

$$T_M = T_0 + xIFS + (M-2)\Delta T_A + (M-2)\Delta T_S + \left(\max_{i\in\{1,2\}} \{N_{ssi}\}\right)\Delta T_L + (N_{ss3} + \ldots + N_{ssM-1})\Delta T_L,$$

where a third transmission time $T_{M2}$ at which the STA M (2<M≤N) sends a training sequence part meets $T_{M2}=T_M+\Delta T_A$.

Correspondingly, in step 5204, the STA M determines, based on the grouping indication, a type of a member group to which the STA M belongs. The type of the member group includes one of the following types: a multi-member group or a single-member group. (1) If the STA M belongs to the multi-member group (for example, M is 1 or 2), the STA M sends a common preamble part of the NDP to the AP at the second transmission time $T_{M1}$ in at least a bandwidth occupied by the $RU_M$, and sends a training sequence part of the NDP to the AP at the third transmission time $T_{M2}$ by using the $RU_M$ and the MU-MIMO technology. (2) If the STA M belongs to the single-member group (for example, 2<M≤N), the STA M sends a common preamble part of the NDP to the AP at the second transmission time $T_{M1}$ in at least a bandwidth occupied by the $RU_M$, and sends a training sequence part of the NDP to the AP at the third transmission time $T_{M2}$ by using the $RU_M$. There is no interframe gap between the NDP and an NDP sent by a STA adjacent to the STA M (for example, a STA M−1 or a STA M+1).

Figure 7:
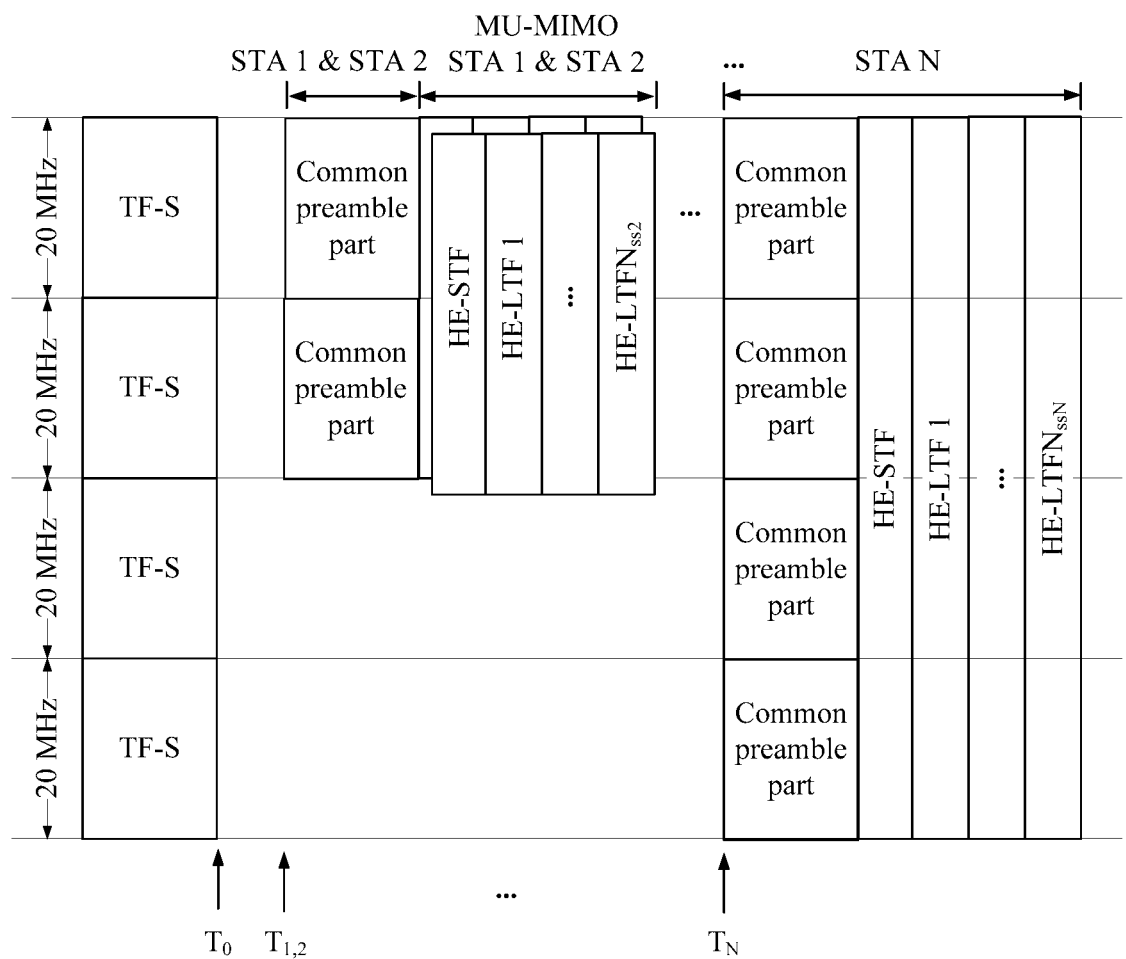
FIG. 7 is schematic diagram 8 of uplink multi-user channel measurement.

Correspondingly, in step S205, the AP receives common preamble parts of NDPs that are simultaneously sent by all STAs belonging to the multi-member group (for example, a STA 1 or a STA 2) based on corresponding transmission parameters at the second transmission time $T_{M1}$ (for example, M is 1 or 2), and receives, by using the MU-MIMO technology, training sequence parts of NDPs that are simultaneously sent based on corresponding transmission parameters at a third transmission time $T_{M2}$ (for example, M is 1 or 2) by all the STAs belonging to the multi-member group; and receives NDPs that include common preamble parts and training sequence parts and that are sent in sequence based on corresponding transmission parameters (for example, corresponding RUs) at corresponding first transmission times (for example, a time point $T_M$ for the STA M, . . . , and a time point $T_N$ for a STA N) (for example, 2<M≤N) by the STA M belonging to the single-member group (2<M≤N). There is no interframe gap between NDPs sent by any two adjacent STAs, as shown in FIG. 7 (FIG. 7 is schematic diagram 8 of uplink multi-user channel measurement).

In Embodiment 7 of a channel measurement method in the present invention, based on the foregoing embodiment, the at least two STAs (for example, N STAs) are classified into at least two member groups. Types of the member groups include a multi-member group and/or a single-member group. The multi-member group includes at least two STAs. The single-member group includes one STA. Correspondingly, the TF-S further includes a grouping indication of each STA. Optionally, the grouping indication of each STA is carried in the common signaling field of the TF-S, or carried in each STA signaling field of the TF-S.

Optionally, a bit indication manner may be used for the grouping indication. All STAs belonging to the multi-member group transmit training sequence parts simultaneously by using uplink MU-MIMO, as shown in FIG. 6A. For example, a STA 1 and a STA 2 are classified into a multi-member group, and the two STAs in the multi-member group send training sequence parts simultaneously to the AP in an uplink MU-MIMO transmission manner. Other STAs different from the STAs belonging to the multi-member group belong to corresponding single-member groups respectively, and all the STAs belonging to the single-member groups send respective training sequence parts in sequence at respective time points. A manner in which each STA sends a common preamble part is the same as a manner in which the common preamble part is sent in Embodiment 4, and details are not repeated herein.

Correspondingly, in step 5203, the STA M determines, based on the parameter indication information corresponding to the STA M, a spatial flow quantity $N_{ssM}$ and a spatial flow location of the STA M and $RU_M$ used by the STA to send the NDP (optionally, the NDP includes a common preamble part and a training sequence part). Further, the STA M determines a fourth transmission time $T_c$ and a fifth transmission time $T_M$ based on parameter indication information corresponding to a STA P (1≤P<M) and the grouping indication (grouping statuses of the STA P and the STA M can be learned based on the grouping indication). The fourth transmission time $T_c$ is a transmission time at which the STA M sends the common preamble part of the NDP, and the fifth transmission time $T_M$ is a transmission time at which the STA M sends the training sequence part of the NDP. Optionally, the STA M determines a spatial flow quantity $N_{ssP}$ of the STA P based on the parameter indication information corresponding to the STA P, determines grouping statuses of the STA P and the STA M based on the grouping indication, and further determines the fourth transmission time $T_c$ and the fifth transmission time $T_M$ based on the spatial flow quantity $N_{ssP}$ and the grouping statuses.

If N STAs are classified into several member groups, sets of STA sequence numbers included in all member groups are recorded as $\phi_1, \phi_2, \ldots, \phi_G$, and the fourth transmission time $T_c$ at which each STA sends the common preamble part is recorded as $T_c=T_0+xIFS$, the fifth transmission time $T_M$ at which the STA M (1≤M≤N) sends the training sequence part may be determined according to formula 9. Formula 9 is:

$$T_M = T_c + \Delta T_A + G_1 \Delta T_S + \left(\max_{i\in\phi_1}\{N_{ssi}\} + \max_{i\in\phi_2}\{N_{ssi}\} + \ldots + \max_{i\in\phi_{G_1}}\{N_{ssi}\}\right)\Delta T_L,$$

where $\phi_1, \phi_2, \ldots, \phi_{G_1}$ are member groups ($G_1$<G) in front of the STA M, and as shown in FIG. 6A, $\phi_1\{1,2\}$, $\phi_2=\{3\}$, $\phi_3=\{4\}, \ldots, \phi_{N-1}=\{N\}$. (1) A fifth transmission time $T_1$ at which the STA 1 sends a training sequence part and a fifth transmission time $T_2$ at which the STA 2 sends a training sequence part are both $T_0+xIFS+\Delta T_A$. (2) The fifth transmission time $T_M$ at which the STA M (2<M≤N) sends the training sequence part meets:

$$T_M = T_C + \Delta T_A + (M-2)\Delta T_S + \left(\max_{i\in\{1,2\}}\{N_{ssi}\}\right)\Delta T_L + (N_{ss3} + \ldots + N_{ssM-1})\Delta T_L.$$

Correspondingly, in step S204, further, the STA M determines, based on the grouping indication, a type of a member group to which the STA M belongs. The type of the member group includes one of the following types: a multi-member group or a single-member group. (1) If the STA M belongs to the multi-member group (for example, M is 1 or 2), the STA M sends a common preamble part of the NDP to the AP at the fourth transmission time $T_c$ in at least a bandwidth occupied by the $RU_M$, and sends a training sequence part of the NDP to the AP at the fifth transmission time $T_M$ by using the $RU_M$ and the MU-MIMO technology. (2) If the STA M belongs to the single-member group (for example, 2<M≤N), the STA M sends a common preamble part of the NDP to the AP at the fourth transmission time $T_c$ in a bandwidth occupied by the $RU_M$, and sends a training sequence part of the NDP to the AP at the fifth transmission time $T_M$ using the $RU_M$. There is no interframe gap between the NDP and a training sequence part sent by a STA adjacent to the STA M (for example, a STA M−1 or a STA M+1). There is no interframe gap between the common preamble part of the NDP and a training sequence part sent by a STA 1 (that is, the $1^{st}$ STA).

Figure 8:
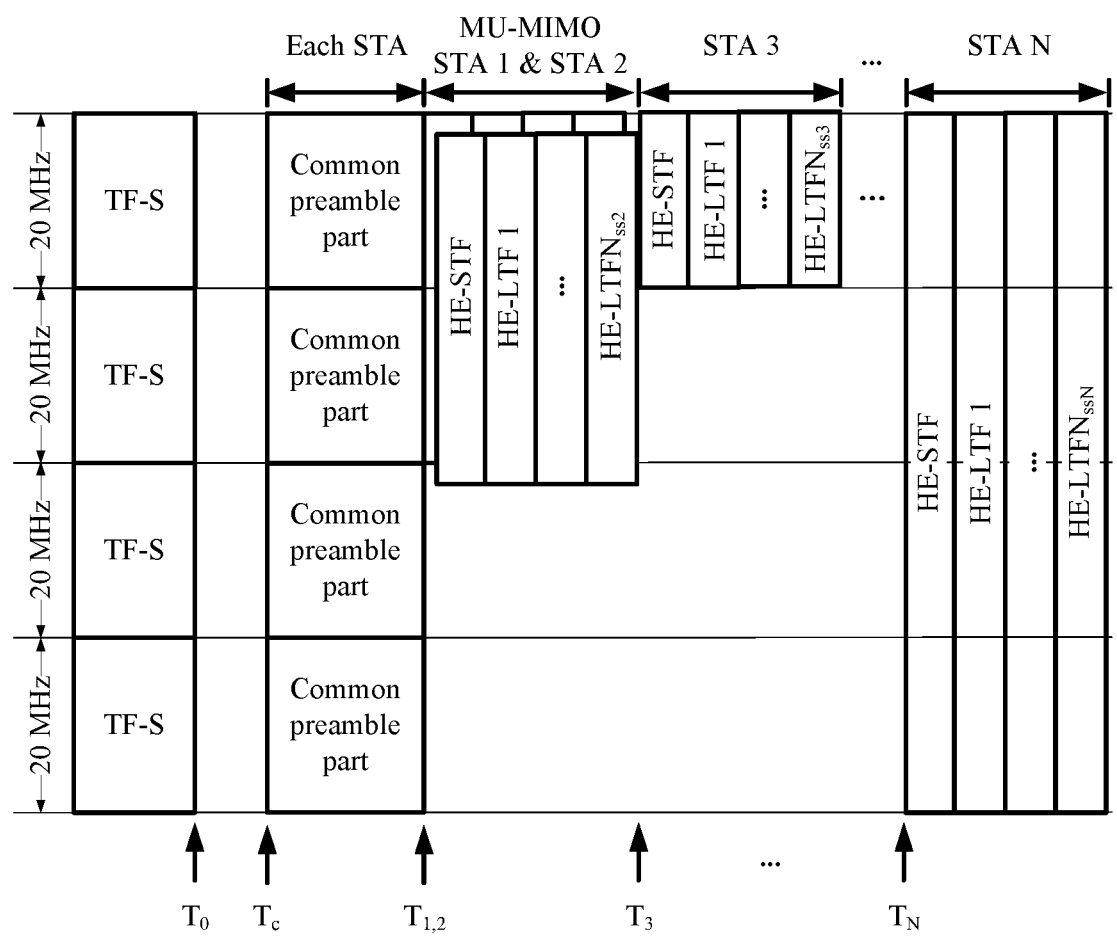
FIG. 8 is schematic diagram 9 of uplink multi-user channel measurement.

Correspondingly, in step S205, the AP receives common preamble parts of NDPs that are simultaneously sent by all the STAs based on corresponding transmission parameters at a fourth transmission time $T_c$, and receives, by using the MU-MIMO technology, training sequence parts of NDPs that are simultaneously sent based on corresponding transmission parameters at a fifth transmission time $T_M$ (for example, M is 1 or 2) by all STAs belonging to the multi-member group. In addition, the AP receives training sequence parts of NDPs that are sent in sequence by all STAs M belonging to the single-member groups (2<M≤N) at corresponding fifth transmission times (for example, a time point $T_M$ for the STA M) (for example, 2<M≤N) by using corresponding transmission parameters (for example, $RU_M$). There is no interframe gap between a common preamble part of the NDP and a training sequence part sent by a STA 1 (that is, the $1^{st}$ STA). There is no interframe gap between training sequence parts sent by any two adjacent STAs, as shown in FIG. 8 (FIG. 8 is schematic diagram 9 of uplink multi-user channel measurement).

Optionally, the TF-S may be an independent data frame, or may be included in another data frame. Generally, the TF-S is included in a data part of a physical layer protocol data unit (Physical layer protocol data unit, PPDU for short) (the TF-S is a type of MAC frame). Because indication information used to indicate a TF-S frame type is included in a MAC header. When receiving the TF-S sent by the AP, the STA can learn, only after decoding the MAC part, that the frame type is a TF-S. When a signaling field A in a physical layer preamble part of a PPDU of a current format in 802.11ax includes indication information of a current basic service set (Basic Service Unit, BSS for short) color. If the AP uses the PPDU of the format in 802.11ax to send a TF-S, after receiving the PPDU including the TF-S and decodes a physical layer header, a STA in an overlapping basic service set (Overlapping Basic Service Unit, OBSS for short) may learn, based on the BSS color information included in the signaling field A in the physical layer preamble, that the PPDU is not a PPDU of a cell in which the STA is located. Therefore, the STA may skip decoding a remaining part of the PPDU (that is, the TF-S included in a MAC part is not decoded), and the STA does not know that the data part of the PPDU includes the TF-S; if the STA performs spatial reuse, uplink transmission, triggered by the TF-S, of another STA may be interfered with.

Therefore, in this embodiment of the present invention, the physical layer preamble part of the PPDU includes trigger frame indication information, where the trigger frame indication information is used to indicate whether the data part of the PPDU includes the Media Access Control MAC frame of a TF-S type; and when the STA receives the PPDU sent by the AP, the STA can learn, after decoding the physical layer preamble part of the PPDU, whether the data part of the PPDU includes the TF-S, so as to perform data transmission or proper backoff. Optionally, in the foregoing embodiment of the present invention, before step S202, the STA determines, based on the trigger frame indication information, that the data part of the PPDU includes the MAC frame of the TF-S type.

Optionally, the signaling field A of the physical layer preamble part of the PPDU carries the trigger frame indication information. Table 1 lists content of a signaling field A in a physical layer preamble part of a downlink SU PPDU in 802.11ax. As listed in Table 1, optionally, a signaling field may be added to the signaling field A to indicate whether the data part of the PPDU includes a MAC frame of a TF-S type, or the trigger frame indication information is carried in a spatial reuse field, or a signaling field is reused to indicate whether the data part of the PPDU includes a MAC frame of a TF-S type. Certainly, another manner may alternatively be used to carry the trigger frame indication information, and this is not limited in this embodiment of the present invention.

TABLE 1

Content of a signaling field A in a physical layer preamble part of a downlink SU PPDU in 802.11ax

| Field | Length (bit) | Description |
|---|---|---|
| Uplink/downlink | 1 | Indicate an uplink data packet or a downlink data packet. |
| Format | 1 | Distinguish between an SU PPDU and a trigger-based uplink PPDU. |
| BSS color | 6 | Indicate an AP identifier. |
| Spatial reuse | To be determined | Indicate a parameter such as a CCA level, an interference level, or a transmission power. |
| TXOP Duration | TBD | Indicate a remaining time in a current TXOP. |
| Bandwidth | 2 | Indicate a bandwidth. |
| Modulation and coding | 4 | |
| Total size of a cyclic prefix and an LTF | 3 | |
| Coding scheme | 2 | |
| Spatial flow quantity | 3 | |
| Space time coding | 1 | |
| Transmit beamforming | 1 | Indicate whether a transmit end performs beamforming. |
| Dual carrier modulation | 1 | |
| Frame extension | 3 | Indicate a frame extension parameter |
| Beam change | 1 | Indicate whether a precoder changes between L-LTF and HE-LTF. |
| CRC | 4 | |
| Tail bit | 6 | |

Table 2 lists content of a signaling field A in a physical layer preamble part of a downlink MU PPDU in 802.11ax. As listed in Table 2, optionally, a signaling field may be added to the signaling field A to indicate whether the data part of the PPDU includes a MAC frame of a TF-S type, or the trigger frame indication information is carried in a spatial reuse field, or a signaling field is reused to indicate whether the data part of the PPDU includes a MAC frame of a TF-S type. Certainly, another manner may alternatively be used to carry the trigger frame indication information, and this is not limited in this embodiment of the present invention.

TABLE 2

Content of a signaling field A in a physical layer preamble part of a downlink MU PPDU in 802.11ax

| Field | Length (bit) | Description |
| --- | --- | --- |
| Uplink/downlink | 1 | Indicate an uplink data packet or a downlink data packet. |
| BSS color | 6 | Indicate an AP identifier. |
| Spatial reuse | To be determined | Indicate a parameter such as a CCA level, an interference level, or a transmission power. |
| TXOP Duration | TBD | Indicate a remaining time in a current TXOP. |
| Bandwidth | ≥2 | |
| Signaling field B modulation and coding scheme | 3 | Indicate a modulation and coding scheme used by a signaling field B. |
| Signaling field B dual-carrier modulation | 1 | Indicate whether dual-carrier modulation is used by the signaling field B. |
| Symbol quantity of signaling field B | 4 | Indicate a quantity of OFDM symbols included in the signaling field B. |
| Signaling field B compression mode | ≥1 | |
| Quantity of HE-LTF symbols | 3 | |
| Total size of a cyclic prefix and an LTF | 3 | |
| LDPC extra symbol | 1 | |
| Frame extension | 3 | |
| CRC | 4 | |
| Tail bit | 6 | |

Figure 9:
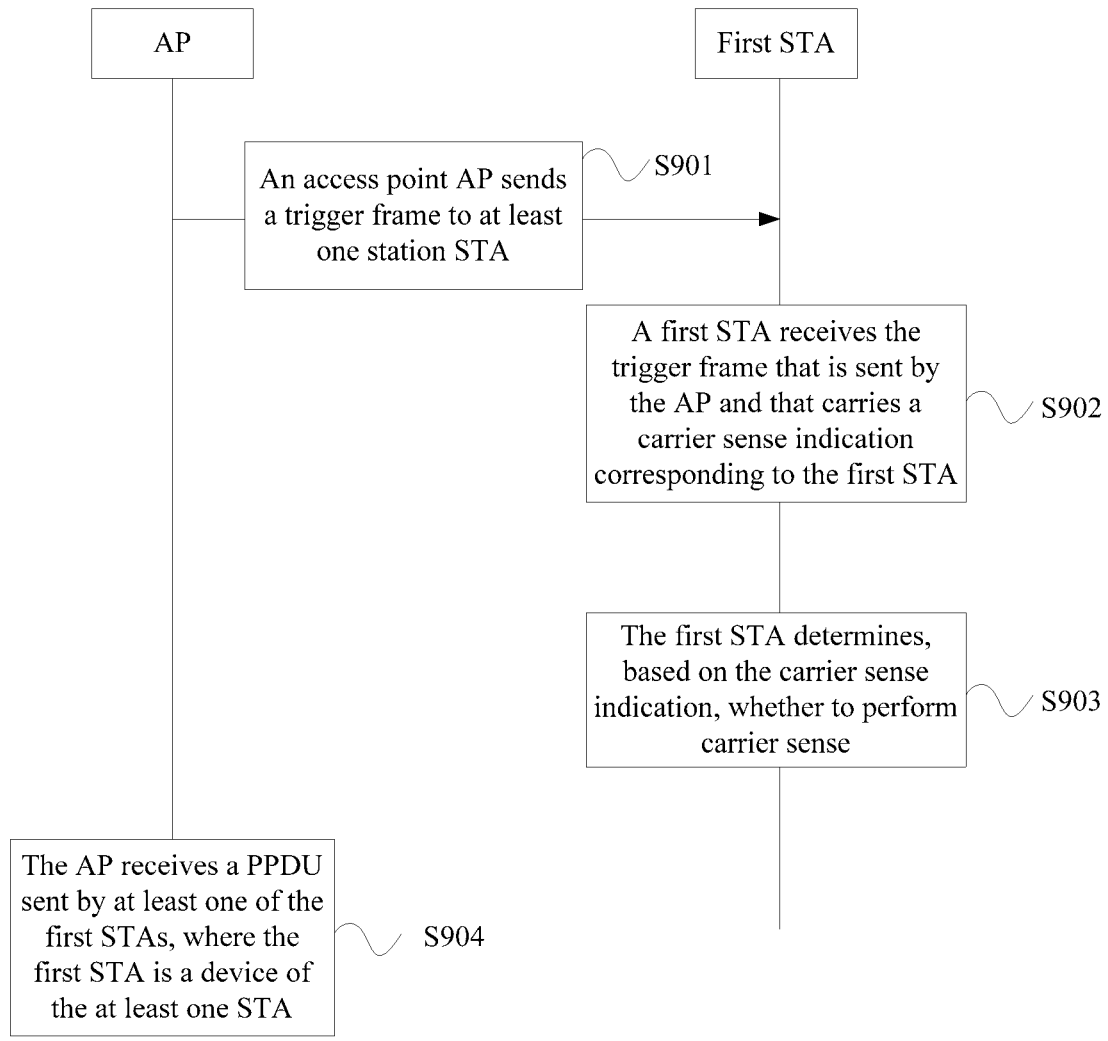
FIG. 9 is a schematic flowchart of an embodiment of a carrier sense indication method according to the present invention.

FIG. 9 is a schematic flowchart of an embodiment of a carrier sense indication method according to the present invention. As shown in FIG. 9, the method in this embodiment may include the following steps.

S901. An AP sends a trigger frame to at least one STA.

In this embodiment of the present invention, the AP sends the trigger frame to the at least one station STA. The trigger frame includes a carrier sense indication corresponding to the STA (for example, a first STA). The carrier sense indication is used to indicate whether the STA needs to perform carrier sense. If the carrier sense indication is used to indicate that the STA does not need to perform carrier sense, the STA directly sends a physical layer protocol data unit PPDU to the STA, with no need to consider a channel status of carrier sense. If the carrier sense indication indicates that the STA needs to perform carrier sense, the STA may perform carrier sense (or certainly, may not perform carrier sense, and the STA determines whether to perform carrier sense) before sending the PPDU to the AP. (1) Optionally, the trigger frame includes one carrier sense indication. The carrier sense indication is used to indicate whether each STA needs to perform carrier sense. Optionally, the carrier sense indication may be carried in a common signaling field of the trigger frame. (2) Optionally, the trigger frame includes a carrier sense indication corresponding to each STA. A carrier sense indication corresponding to each STA is used to indicate whether the corresponding STA needs to perform carrier sense. Optionally, the carrier sense indication corresponding to each STA may be carried in a common signaling field of the trigger frame, or may be carried in a corresponding STA signaling field of the trigger frame. Optionally, the carrier sense includes physical carrier sense and virtual carrier sense. For descriptions about physical carrier sense and virtual carrier sense, refer to the foregoing embodiments of the present invention, and details are not repeated herein.

S902. A first STA receives the trigger frame that is sent by the AP and that carries a carrier sense indication corresponding to the first STA.

S903. The first STA determines, based on the carrier sense indication, whether to perform carrier sense.

In this step, the first STA determines, based on the carrier sense indication, whether to perform carrier sense. (1) If the carrier sense indication is used to indicate whether the first STA does not need to perform carrier sense, that is, the first STA determines that carrier sense is not required, the first STA directly sends a PPDU to the AP to respond to the trigger frame, with no need to consider a channel status of carrier sense. (2) If the carrier sense indication indicates that the first STA needs to perform carrier sense, the first STA may perform carrier sense (or certainly, may not perform carrier sense, and the first STA determines whether to perform carrier sense. Optionally, the carrier sense includes physical carrier sense and virtual carrier sense) before sending a PPDU to the AP to respond to the trigger frame. (2a) When the first STA determines to perform carrier sense and determines that a carrier sense result is that a channel is idle, the first STA sends a PPDU to the AP. (2b) When the first STA determines to perform carrier sense and determines that a carrier sense result is that a channel is busy, the first STA does not send a PPDU to the AP. (2c) When the first STA determines not to perform carrier sense (without considering a channel status), the first STA directly sends a PPDU to the AP.

S904. The AP receives a PPDU sent by at least one of the first STAs, where the first STA is a device of the at least one STA.

In this step, the AP receives the PPDU directly sent by the at least one of the first STAs or sent after the at least one of the first STAs detects that a channel is idle. It can be learned that in this embodiment of the present invention, the AP sends a trigger frame including a carrier sense indication to each STA, so that each STA determines, based on the carrier sense indication, whether to perform carrier sense. Compared with the prior art in which carrier sense is performed each time, in the present invention, the carrier sense indication method is more flexible, and improves data transmission efficiency.

Optionally, the trigger frame may be an independent data frame, or may be included in another data frame. Generally, the trigger frame may be included in a data part of the PPDU. In the prior art, indication information used to indicate a frame type of a trigger frame is included in a MAC header; therefore, when a STA receives a PPDU sent by an AP, the STA can learn of a type of the trigger frame only when a MAC part is decoded. Optionally, the trigger frame may be a TF-S (Trigger Frame for Sounding), a TF-R (Trigger Frame for Random Access), or the like. When a signaling field A in a physical layer preamble part of a PPDU of a current format in 802.11ax includes BSS color indication information. If the AP uses the PPDU of the format in 802.11ax to send the trigger frame, after receiving the PPDU including the trigger frame and decodes a physical layer header, an OBSS STA may learn, based on the BSS color information included in the signaling field A in the physical layer preamble, that the PPDU is not a PPDU of a cell in which the STA is located. Therefore, the STA may skip decoding a remaining part of the PPDU (that is, the trigger frame included in a MAC part is not decoded), and the STA does not know a type of the trigger frame included in the data part of the PPDU; if the STA performs spatial reuse, uplink transmission, triggered by the trigger frame, of another STA may be interfered with.

Therefore, in this embodiment of the present invention, the physical layer preamble part of the PPDU includes trigger frame indication information, where the trigger frame indication information is used to indicate a type of the trigger frame; and when the STA receives the PPDU sent by the AP, the STA can learn of the type of the trigger frame included in the PPDU after decoding the physical layer preamble part of the PPDU, so as to transmit data or perform proper backoff.

Figure 10:
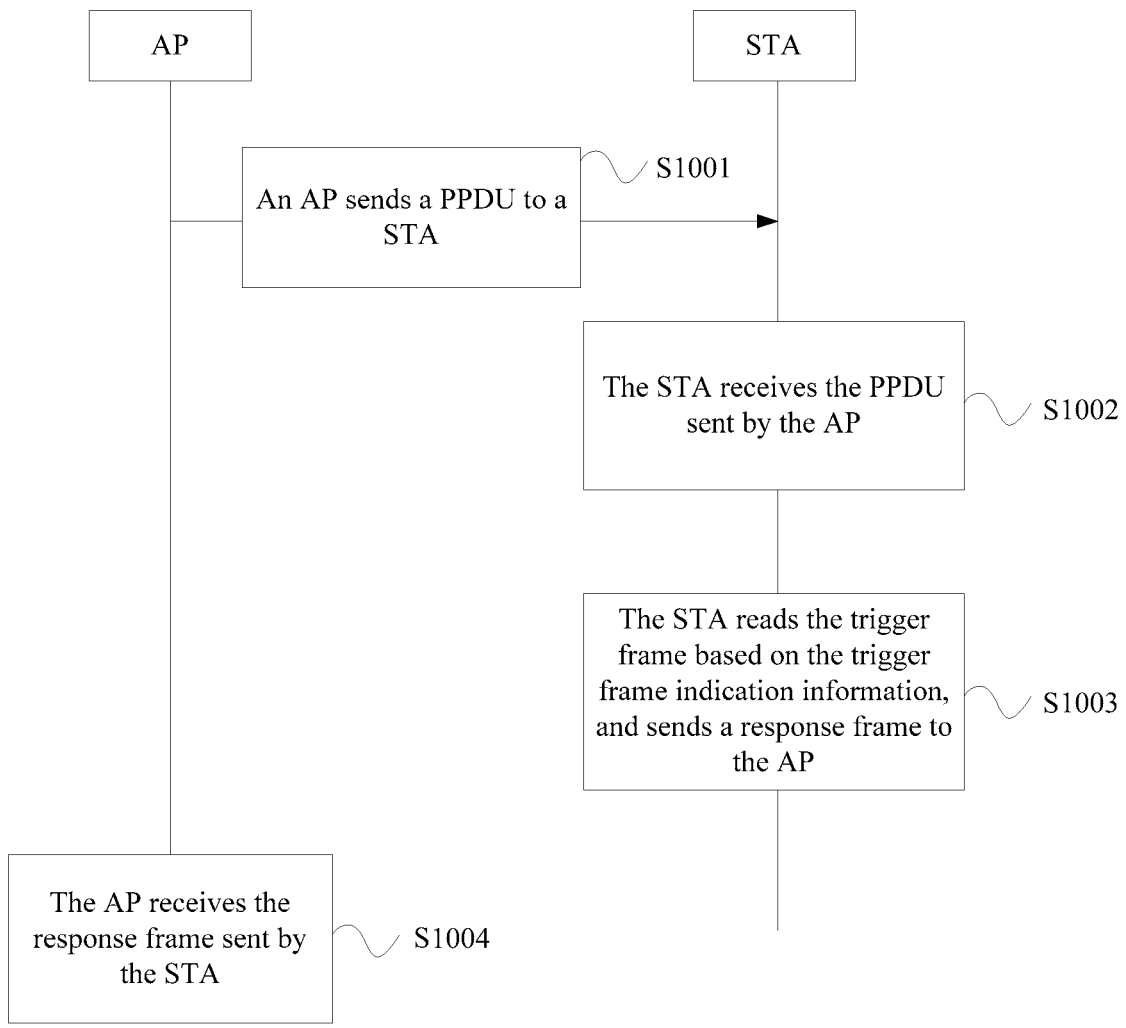
FIG. 10 is a schematic flowchart of an embodiment of a trigger frame indication method according to the present invention.

FIG. 10 is a schematic flowchart of an embodiment of a trigger frame indication method according to the present invention. As shown in FIG. 10, the method in this embodiment may include the following steps.

S1001. An AP sends a PPDU to a STA.

A data part of the PPDU includes a trigger frame. A physical layer preamble part of the PPDU includes trigger frame indication information. The trigger frame indication information is used to indicate a type of the trigger frame. Optionally, the trigger frame indication information is carried in a signaling field A in the physical layer preamble part.

As listed in Table 1 or Table 2, optionally, a signaling field may be added to the signaling field A to indicate a type of the trigger frame, or the trigger frame indication information is carried in a spatial reuse field, or a signaling field is reused to indicate a type of the trigger frame. Certainly, another manner may alternatively be used to carry the trigger frame indication information, and this is not limited in this embodiment of the present invention.

S1002. The STA receives the PPDU sent by the AP.

S1003. The STA reads the trigger frame based on the trigger frame indication information, and sends a response frame to the AP.

In this step, the STA can learn of the type of the trigger frame based on the trigger frame indication information included in the physical layer preamble part of the PPDU, and reads the trigger frame, so as to send the response frame to the AP to respond to the PPDU.

S1004. The AP receives the response frame sent by the STA.

It can be learned that in this embodiment of the present invention, because the physical layer preamble part of the PPDU includes the trigger frame indication information used to indicate the type of the trigger frame, when receiving the PPDU, the STA can learn, by reading the physical layer preamble part of the PPDU, of the type of the trigger frame included in the PPDU, so as to transmit data more flexibly.

Figure 11:
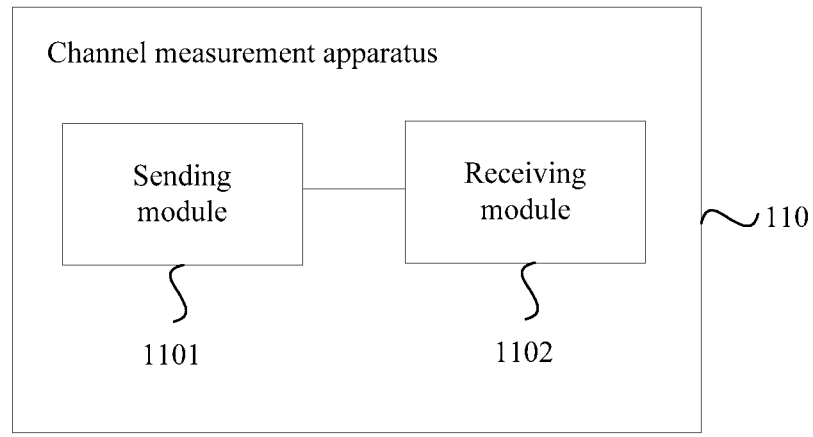
FIG. 11 is a schematic structural diagram of Embodiment 1 of a channel measurement apparatus according to the present invention.

FIG. 11 is a schematic structural diagram of Embodiment 1 of a channel measurement apparatus according to the present invention. An AP includes the channel measurement apparatus. Optionally, the channel processing apparatus may be implemented by using software and/or hardware. As shown in FIG. 11, the channel measurement apparatus 110 provided in this embodiment includes:

a sending module 1101, configured to send a channel measurement trigger frame TF-S to at least two stations STAs, where the TF-S is used to trigger the at least two STAs to send null data packets NDPs used for uplink channel measurement, the TF-S includes parameter indication information of a transmission parameter used by each STA to send the NDP, and the parameter indication information is used by the STA to determine the transmission parameter and a transmission time; and a receiving module 1102, configured to: receive an NDP sent by each of the at least two STAs based on a corresponding transmission parameter of the STA at a transmission time corresponding to each STA, and perform channel measurement, where there is no interframe gap between NDPs sent by any two adjacent STAs of the at least two STAs.

Further, the parameter indication information of the transmission parameter used by each STA to send the NDP includes one of or any combination of the following information:

an association identifier AID of the STA, spatial flow indication information of the STA, and channel resource unit RU indication information used by the STA to send the NDP.

The AID of the STA is used to indicate that the STA needs to send the NDP to the AP; and the spatial flow indication information of the STA includes indication information used by the STA to send a training sequence part of the NDP to the AP.

Further, the TF-S further includes a carrier sense indication corresponding to each STA; the carrier sense indication is used to indicate whether the STA needs to perform carrier sense; and if the carrier sense indication indicates that the STA does not need to perform carrier sense, the STA directly sends the NDP to the AP, or if the carrier sense indication indicates that the STA needs to perform carrier sense, the STA performs carrier sense before sending the NDP to the AP.

Further, the TF-S is included in a data part of a physical layer protocol data unit PPDU. A physical layer preamble part of the PPDU includes trigger frame indication information, and the trigger frame indication information is used to indicate whether the data part includes a Media Access Control MAC frame of a TF-S type Further, a common signaling field of the TF-S includes type indication information, and the type indication information is used to indicate that a trigger frame type is a TF-S.

Further, the receiving module 1102 is specifically configured to: receive the NDPs sent in sequence by all of the STAs based on corresponding transmission parameters at corresponding first transmission times. The NDP includes a common preamble part and a training sequence part, or the NDP includes a training sequence part.

Further, the receiving module 1102 includes:

a first receiving unit, configured to receive common preamble parts of NDPs simultaneously sent by all of the STAs based on corresponding transmission parameters at a fourth transmission time, where the fourth transmission time is a transmission time at which each STA sends a common preamble part of an NDP; and a second receiving unit, configured to receive training sequence parts of NDPs sent in sequence by all of the STAs based on corresponding transmission parameters at corresponding fifth transmission times, where the fifth transmission time corresponding to each STA is a transmission time at which the STA sends the training sequence part of the NDP.

There is no interframe gap between the common preamble part of the NDP and a training sequence part sent by the 1$^{st}$ STA, and there is no interframe gap between training sequence parts sent by any two adjacent STAs; and the 1$^{st}$ STA is a STA that is the first STA of the at least two STAs to send a training sequence part.

Further, the at least two STAs are classified into at least two member groups. Types of the member groups include a multi-member group and/or a single-member group. The multi-member group includes at least two STAs. The single-member group includes one STA. Correspondingly, the TF-S further includes a grouping indication of each STA.

The receiving module 1102 includes:

a third receiving unit, configured to receive, by using a multi-user multiple-input multiple-output MU-MIMO technology, NDPs simultaneously sent based on corresponding transmission parameters at a first transmission time by all STAs belonging to the multi-member group, where the first transmission time is a transmission time at which each STA sends an NDP; and a fourth receiving unit, configured to receive NDPs sent in sequence based on corresponding transmission parameters at corresponding first transmission times by all STAs belonging to the single-member group, where the first transmission time corresponding to each STA is a transmission time at which the STA sends an NPD.

The NDP includes a training sequence part.

Further, the at least two STAs are classified into at least two member groups. Types of the member groups include a multi-member group and/or a single-member group. The multi-member group includes at least two STAs. The single-member group includes one STA. Correspondingly, the TF-S further includes a grouping indication of each STA.

The receiving module 1102 includes:

a fifth receiving unit, configured to: receive common preamble parts of NDPs simultaneously sent based on corresponding transmission parameters at a second transmission time by all STAs belonging to the multi-member group, and receive, by using a MU-MIMO technology, training sequence parts of the NDPs simultaneously sent based on corresponding transmission parameters at a third transmission time by all STAs belonging to the multi-member group, where the second transmission time is a transmission time at which each STA sends a common preamble part of an NDP, and the third transmission time is a transmission time at which each STA sends a training sequence part of the NDP; and a sixth receiving unit, configured to receive NDPs sent in sequence based on corresponding transmission parameters at corresponding first transmission times by all STAs belonging to the single-member group, where the NDP includes a common preamble part and a training sequence part.

Further, the at least two STAs are classified into at least two member groups. Types of the member groups include a multi-member group and/or a single-member group. The multi-member group includes at least two STAs. The single-member group includes one STA. Correspondingly, the TF-S further includes a grouping indication of each STA.

The receiving module 1102 includes:

a seventh receiving unit, configured to receive common preamble parts of NDPs simultaneously sent by all the STAs based on corresponding transmission parameters at a fourth transmission time, where the fourth transmission time is a transmission time at which each STA sends a common preamble part of an NDP;

an eighth receiving unit, configured to receive, by using a MU-MIMO technology, training sequence parts of NDPs simultaneously sent based on corresponding transmission parameters at a fifth transmission time by all STAs belonging to the multi-member group, where the fifth transmission time is a transmission time at which each STA sends a training sequence part of an NDP; and a ninth receiving unit, configured to receive training sequence parts of NDPs sent in sequence based on corresponding transmission parameters at corresponding fifth transmission times by all STAs belonging to the single-member group, where the fifth transmission time corresponding to each STA is a transmission time at which the STA sends a training sequence part of an NDP.

There is no interframe gap between the common preamble part of the NDP and a training sequence part sent by the $1^{st}$ STA, and there is no interframe gap between training sequence parts sent by any two adjacent STAs; and the $1^{st}$ STA is a STA that is the first STA of the at least two STAs to send a training sequence part.

Further, the sending module 1101 is specifically configured to send the TF-S to the at least two STAs in at least a primary preset-bandwidth channel.

The channel measurement apparatus of this embodiment of the present invention may be configured to execute the technical solution of the foregoing channel measurement method embodiment of the present invention. An implementation principle and a technical effect of the channel measurement apparatus are similar to those of the channel measurement method, and details are not repeated herein.

Figure 12:
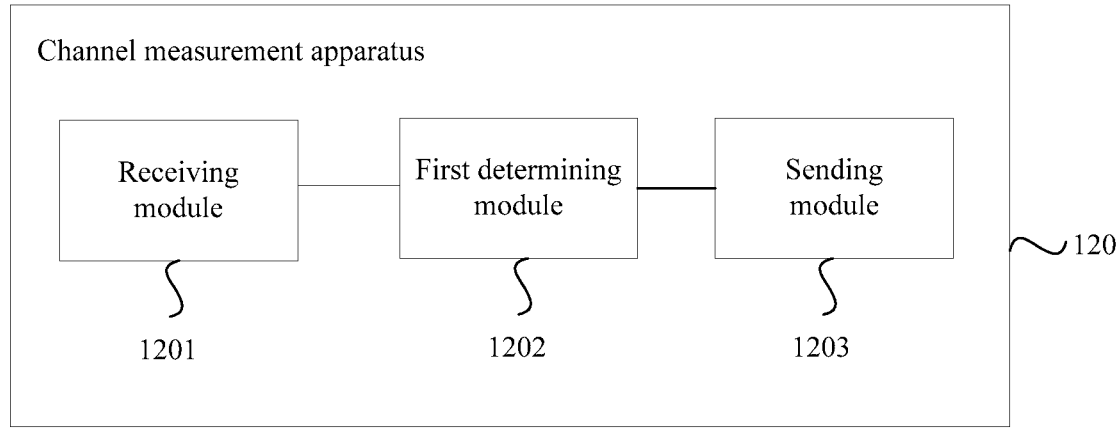
FIG. 12 is a schematic structural diagram of Embodiment 2 of a channel measurement apparatus according to the present invention.

FIG. 12 is a schematic structural diagram of Embodiment 2 of a channel measurement apparatus according to the present invention. A first STA includes the channel measurement apparatus. Optionally, the channel processing apparatus may be implemented by using software and/or hardware. As shown in FIG. 12, the channel measurement apparatus 120 provided in this embodiment includes:

a receiving module 1201, configured to receive a channel measurement trigger frame TF-S sent by an access point AP, where the TF-S is used to trigger at least two STAs to send null data packets NDPs used for uplink channel measurement, the TF-S includes parameter indication information of a transmission parameter used by each STA to send the NDP, and the first STA is one of the at least two STAs;

a first determining module 1202, configured to determine a transmission parameter and a transmission time based on the parameter indication information; and a sending module 1203, configured to send an NDP to the AP based on the transmission parameter at the transmission time, where there is no interframe gap between the NDP and an NDP sent by any STA adjacent to the STA.

Further, the parameter indication information of the transmission parameter used by each STA to send the NDP includes one of or any combination of the following information:

an association identifier AID of the STA, spatial flow indication information of the STA, and channel resource unit RU indication information used by the STA to send the NDP.

The AID of the STA is used to indicate that the STA needs to send the NDP to the AP; and the spatial flow indication information of the STA includes indication information used by the STA to send a training sequence part of the NDP to the AP.

Further, the TF-S further includes a carrier sense indication corresponding to each STA; the carrier sense indication is used to indicate whether the STA needs to perform carrier sense; and if the carrier sense indication indicates that the STA does not need to perform carrier sense, the STA directly sends the NDP to the AP, or if the carrier sense indication indicates that the STA needs to perform carrier sense, the STA performs carrier sense before sending the NDP to the AP.

Further, the channel measurement apparatus 130 further includes:

a second determining module, configured to determine, based on the carrier sense indication, whether to perform carrier sense.

Correspondingly, the sending module 1203 is specifically configured to:

when the second determining module determines that carrier sense does not need to be performed or determines that carrier sense needs to be performed and a sense result is that the channel is idle, send the NDP to the AP based on the transmission parameter at the transmission time.

Further, a common signaling field of the TF-S includes type indication information, and the type indication information is used to indicate that a trigger frame type is a TF-S.

Further, the TF-S is included in a data part of a physical layer protocol data unit PPDU. A physical layer preamble part of the PPDU includes trigger frame indication information, and the trigger frame indication information is used to indicate whether the data part includes a Media Access Control MAC frame of a TF-S type.

Further, the channel measurement apparatus 120 further includes:

a third determining module, configured to determine, based on the trigger frame indication information, that the data part of the PPDU includes a MAC frame of a TF-S type.

Further, the first determining module 1202 includes:

a first determining unit, configured to determine, based on parameter indication information corresponding to the first STA, a spatial flow quantity $N_{ss}$ and a spatial flow location of the first STA and an RU used by the first STA to send the NDP, where the NDP includes a training sequence part; and a second determining unit, configured to determine a first transmission time based on parameter indication information corresponding to a second STA, where the second STA includes a STA whose signaling field is in front of a signaling field of the first STA in the signaling fields of the TF-S, and the first transmission time is a transmission time at which the first STA sends the NDP.

Correspondingly, the sending module 1203 is specifically configured to send the NDP to the AP at the first transmission time by using the RU.

Further, the NDP further includes a common preamble part. Correspondingly, the first transmission time includes a second transmission time at which the first STA sends the common preamble part of the NDP and a third transmission time at which the first STA sends a training sequence part of the NDP.

Correspondingly, the sending module 1203 is specifically configured to:

send the common preamble part of the NDP to the AP at the second transmission time in at least a bandwidth occupied by the RU; and send the training sequence part of the NDP to the AP at the third transmission time by using the RU.

Further, the first determining module 1202 includes:

a third determining unit, configured to determine, based on parameter indication information corresponding to the first STA, a spatial flow quantity $N_{ss}$ and a spatial flow location of the first STA and an RU used by the first STA to send the NDP, where the NDP includes a common preamble part and a training sequence part; and a fourth determining unit, configured to determine a fourth transmission time and a fifth transmission time based on parameter indication information corresponding to a second STA, where the second STA includes a STA whose signaling field is in front of a signaling field of the first STA in the signaling fields of the TF-S; and the fourth transmission time is a transmission time at which the first STA sends the common preamble part of the NDP, and the fifth transmission time is a transmission time at which the first STA sends the training sequence part of the NDP.

Correspondingly, the sending module 1203 is specifically configured to:

send the common preamble part of the NDP to the AP at the fourth transmission time in at least a bandwidth occupied by the RU; and send the training sequence part of the NDP to the AP at the fifth transmission time by using the RU.

Further, the TF-S further includes a grouping indication of each STA.

Correspondingly, the first determining module 1202 includes:

a fifth determining module, configured to determine, based on parameter indication information corresponding to the first STA, a spatial flow quantity $N_{ss}$ and a spatial flow location of the first STA and an RU used by the first STA to send the NDP, where the NDP includes a training sequence part; and a sixth determining unit, configured to determine a first transmission time based on the grouping indication and parameter indication information corresponding to a second STA, where the second STA includes a STA whose signaling field is in front of a signaling field of the first STA in the signaling fields of the TF-S, and the first transmission time is a transmission time at which the first STA sends the NDP.

Correspondingly, the sending module 1203 is specifically configured to:

determine, based on the grouping indication, a type of a member group to which the first STA belongs, where the type of the member group includes one of the following types: a multi-member group or a single-member group; the multi-member group includes at least two STAs; and the single-member group includes one STA; and if the first STA belongs to the multi-member group, send the NDP to the AP at the first transmission time by using the RU and a multi-user multiple-input multiple-output MU-MIMO technology; or if the first STA belongs to the single-member group, send the NDP to the AP at the first transmission time by using the RU.

Further, the TF-S further includes a grouping indication of each STA.

Correspondingly, the first determining module 1202 includes:

a seventh determining unit, configured to determine, based on parameter indication information corresponding to the first STA, a spatial flow quantity $N_{ss}$ and a spatial flow location of the first STA and an RU used by the first STA to send the NDP, where the NDP includes a common preamble part and a training sequence part; and an eighth determining unit, configured to determine a first transmission time based on the grouping indication and parameter indication information corresponding to a second STA, where the second STA includes a STA whose signaling field is in front of a signaling field of the first STA in the signaling fields of the TF-S, and the first transmission time includes a second transmission time at which the first STA sends the common preamble part of the NDP and a third transmission time at which the first STA sends the training sequence part of the NDP.

Correspondingly, the sending module 1203 is specifically configured to:

determine, based on the grouping indication, a type of a member group to which the first STA belongs, where the type of the member group includes one of the following types: a multi-member group or a single-member group; the multi-member group includes at least two STAs; and the single-member group includes one STA; and if the first STA belongs to the multi-member group, send the common preamble part of the NDP to the AP at the second transmission time in at least a bandwidth occupied by the RU, and send the training sequence part of the NDP to the AP at the third transmission time by using the RU and a MU-MIMO technology; or if the first STA belongs to the single-member group, send the common preamble part of the NDP to the AP at the second transmission time in at least a bandwidth occupied by the RU, and send the training sequence part of the NDP to the AP at the third transmission time by using the RU.

Further, the TF-S further includes a grouping indication of each STA.

Correspondingly, the first determining module 1202 includes:

a ninth determining unit, configured to determine, based on parameter indication information corresponding to the first STA, a spatial flow quantity $N_{ss}$ and a spatial flow location of the first STA and an RU used by the first STA to send the NDP, where the NDP includes a common preamble part and a training sequence part; and a tenth determining unit, configured to determine a fourth transmission time and a fifth transmission time based on parameter indication information corresponding to a second STA, where the fourth transmission time is a transmission time at which the first STA sends the common preamble part of the NDP, and the fifth transmission time is a transmission time at which the first STA sends the training sequence part of the NDP.

Correspondingly, the sending module 1203 is specifically configured to:

determine, based on the grouping indication, a type of a member group to which the first STA belongs, where the type of the member group includes one of the following types: a multi-member group or a single-member group; the multi-member group includes at least two STAs; and the single-member group includes one STA; and if the first STA belongs to the multi-member group, send the common preamble part of the NDP to the AP at the fourth transmission time in at least a bandwidth occupied by the RU, and send the training sequence part of the NDP to the AP at the fifth transmission time by using the RU and a MU-MIMO technology; or if the first STA belongs to the single-member group, send the common preamble part of the NDP to the AP at the fourth transmission time in at least a bandwidth occupied by the RU, and send the training sequence part of the NDP to the AP at the fifth transmission time by using the RU.

Further, the receiving module 1201 is specifically configured to receive, in at least a primary preset-bandwidth channel, the TF-S sent by the AP.

The channel measurement apparatus of this embodiment of the present invention may be configured to execute the technical solution of the foregoing channel measurement method embodiment of the present invention. An implementation principle and a technical effect of the channel measurement apparatus are similar to those of the channel measurement method, and details are not repeated herein.

Figure 13:
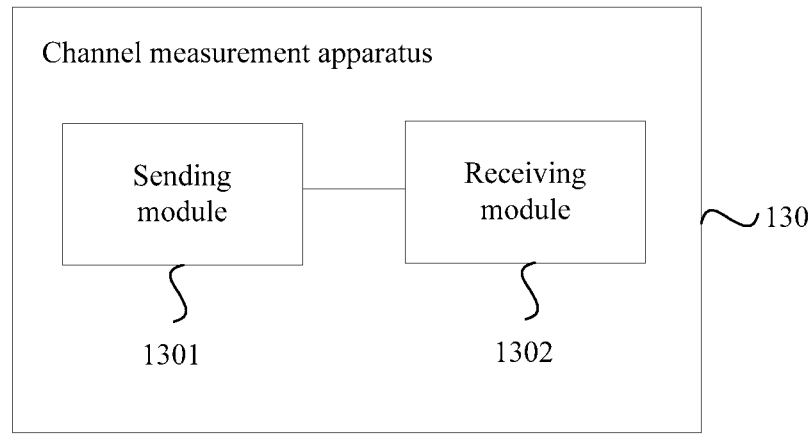
FIG. 13 is a schematic structural diagram of Embodiment 3 of a channel measurement apparatus according to the present invention.

FIG. 13 is a schematic structural diagram of Embodiment 3 of a channel measurement apparatus according to the present invention. An AP includes the channel measurement apparatus. Optionally, the channel processing apparatus may be implemented by using software and/or hardware. As shown in FIG. 13, the channel measurement apparatus 130 provided in this embodiment includes:

a sending module 1301, configured to send a trigger frame to at least one station STA, where the trigger frame includes a carrier sense indication corresponding to the STA; the carrier sense indication is used to indicate whether the STA needs to perform carrier sense; and if the carrier sense indication is used to indicate that the STA does not need to perform carrier sense, the STA directly sends a physical layer protocol data unit PPDU to the STA, or if the carrier sense indication is used to instruct the STA to perform carrier sense, the STA may perform carrier sense before sending a PPDU to the AP; and a receiving module 1302, configured to receive a PPDU sent by at least one first STA, where the first STA is a device of the at least one STA.

The channel measurement apparatus of this embodiment of the present invention may be configured to execute the technical solution of the foregoing carrier sense indication method embodiment of the present invention. An implementation principle and a technical effect of the channel measurement apparatus are similar to those of the carrier sense indication method, and details are not repeated herein.

Figure 14:
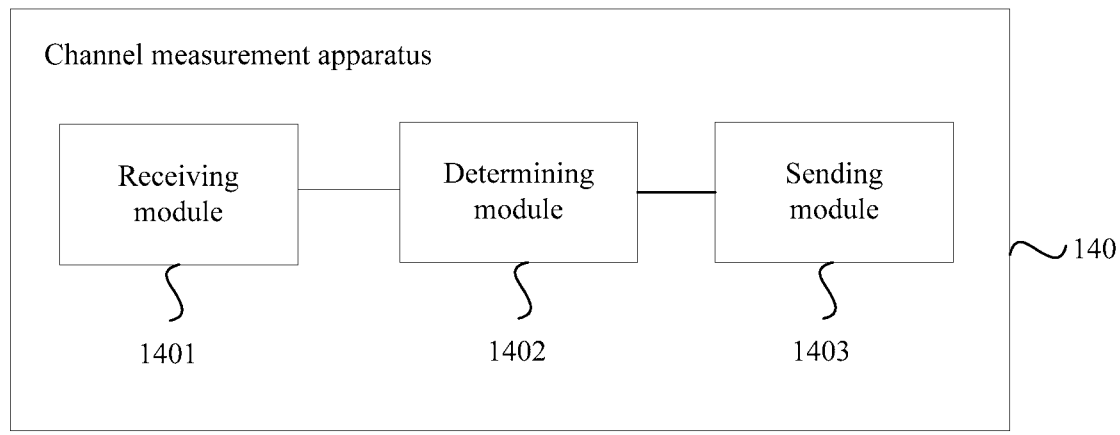
FIG. 14 is a schematic structural diagram of Embodiment 4 of a channel measurement apparatus according to the present invention.

FIG. 14 is a schematic structural diagram of Embodiment 4 of a channel measurement apparatus according to the present invention. A first STA includes the channel measurement apparatus. Optionally, the channel processing apparatus may be implemented by using software and/or hardware. As shown in FIG. 14, the channel measurement apparatus 140 provided in this embodiment includes:

a receiving module 1401, configured to receive a trigger frame sent by an access point AP, where the trigger frame includes a carrier sense indication corresponding to the first STA, and the carrier sense indication is used to indicate whether the first STA needs to perform carrier sense;

a determining module 1402, configured to determine, based on the carrier sense indication, whether to perform carrier sense; and a sending module 1403, configured to: if the carrier sense indication is used to indicate that the first STA does not need to perform carrier sense, directly send a physical layer protocol data unit PPDU to the AP; or if the carrier sense indication is used to indicate that the first STA needs to perform carrier sense, perform carrier sense before sending a PPDU to the AP.

The channel measurement apparatus of this embodiment of the present invention may be configured to execute the technical solution of the foregoing carrier sense indication method embodiment of the present invention. An implementation principle and a technical effect of the channel measurement apparatus are similar to those of the carrier sense indication method, and details are not repeated herein.

Figure 15:
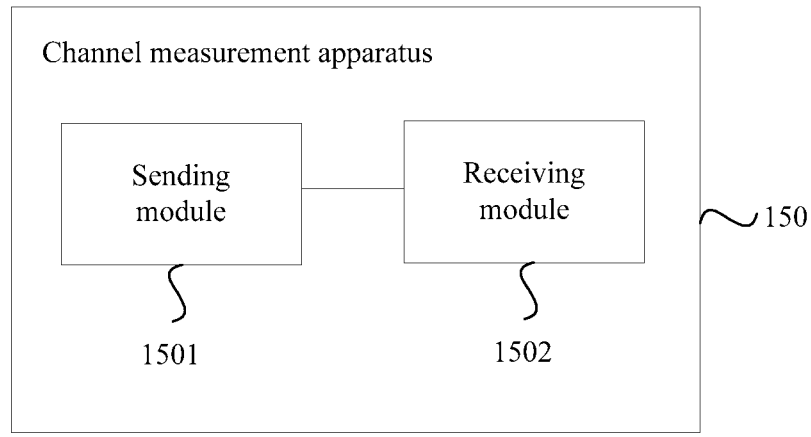
FIG. 15 is a schematic structural diagram of Embodiment 5 of a channel measurement apparatus according to the present invention.

FIG. 15 is a schematic structural diagram of Embodiment 5 of a channel measurement apparatus according to the present invention. An AP includes the channel measurement apparatus. Optionally, the channel processing apparatus may be implemented by using software and/or hardware. As shown in FIG. 15, the channel measurement apparatus 150 provided in this embodiment includes:

a sending module 1501, configured to send a physical layer protocol data unit PPDU to a station STA, where a data part of the PPDU includes a trigger frame, a physical layer preamble part of the PPDU includes trigger frame indication information, and the trigger frame indication information is used to indicate a type of the trigger frame; and a receiving module 1502, configured to receive a response frame sent by the STA.

The channel measurement apparatus of this embodiment of the present invention may be configured to execute the technical solution of the foregoing trigger frame indication method embodiment of the present invention. An implementation principle and a technical effect of the channel measurement apparatus are similar to those of the trigger frame indication method, and details are not repeated herein.

Figure 16:
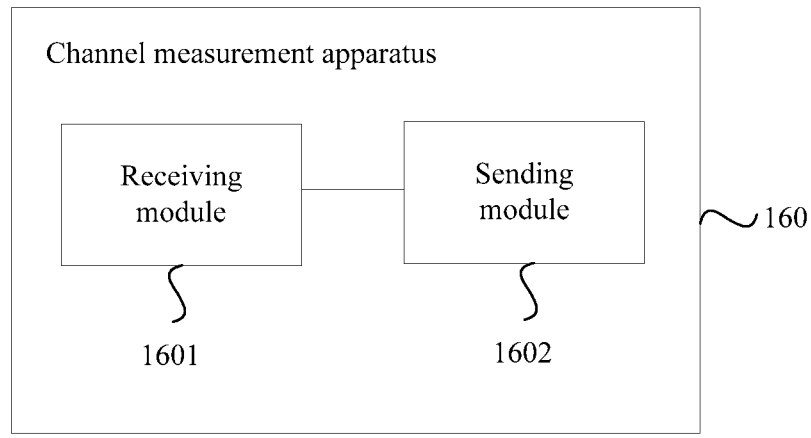
FIG. 16 is a schematic structural diagram of Embodiment 6 of a channel measurement apparatus according to the present invention.

FIG. 16 is a schematic structural diagram of Embodiment 6 of a channel measurement apparatus according to the present invention. A STA includes the channel measurement apparatus. Optionally, the channel processing apparatus may be implemented by using software and/or hardware. As shown in FIG. 16, the channel measurement apparatus 160 provided in this embodiment includes:

a receiving module 1601, configured to receive a physical layer protocol data unit PPDU sent by an access point AP, where a data part of the PPDU includes a trigger frame, a physical layer preamble part of the PPDU includes trigger frame indication information, and the trigger frame indication information is used to indicate a type of the trigger frame; and a sending module 1602, configured to: read the trigger frame based on the trigger frame indication information, and send a response frame to the AP.

The channel measurement apparatus of this embodiment of the present invention may be configured to execute the technical solution of the foregoing trigger frame indication method embodiment of the present invention. An implementation principle and a technical effect of the channel measurement apparatus are similar to those of the trigger frame indication method, and details are not repeated herein.

Figure 17:
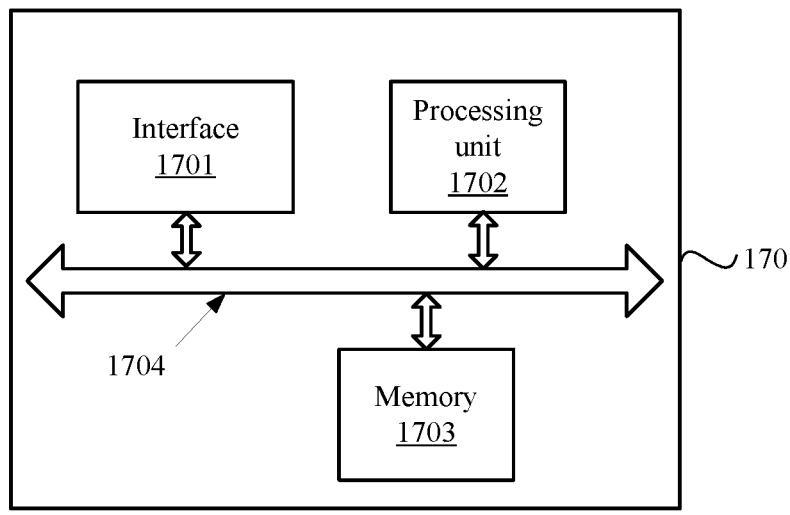
FIG. 17 is a schematic structural diagram of an embodiment of an AP according to the present invention.

FIG. 17 is a schematic structural diagram of an embodiment of an AP according to the present invention. As shown in FIG. 17, the AP 170 provided in this embodiment includes an interface 1701, a processing unit 1702, and a memory 1703. The processing unit 1702 controls an operation of the AP 170. The interface 1701 sends data or a message under control of the processor 1701. The memory 1703 may include a read-only memory and a random access memory, and provide instructions and data for the processing unit 1702. A part of the memory 1703 may further include a non-volatile random access memory (NVRAM). Components of the AP 170 are coupled together by using a bus system 1704. The bus system 1704 includes not only a data bus, but also a power supply bus, a control bus, and a status signal bus. However, for clear description, various buses are denoted by the bus system 1704 in the diagram.

The method disclosed in the foregoing embodiment of the present invention is applicable to the processing unit 1702, or implemented by the processing unit 1702. During implementation, the operation of the foregoing method embodiments may be executed by the AP 170 by using an integrated logic circuit of hardware in the processing unit 1702 or by using a software instruction. The processing unit 1702 may be a general purpose processor, a digital signal processor, a dedicated integrated circuit, a field programmable gate array or another programmable logic device, a discrete gate or a transistor logic device, or a discrete hardware component, and may implement or execute methods, steps, or logical block diagrams disclosed in the embodiments of the present invention. The general purpose processor may be a microprocessor, any conventional processor, or the like. The steps of the method disclosed with reference to this embodiment of the present invention may be directly implemented by a hardware processor, or may be implemented by a combination of hardware and a software module in a processor. The software module may be located in a random access memory, a flash memory, a read-only memory, a programmable read-only memory or an erasable programmable memory, a register, or another mature storage medium in the art. The storage medium is located in the memory 1703. The processing unit 1702 executes the instructions in the memory 1703, so that the AP 170 performs the steps in the foregoing methods. For an implementation principal and a technical effect of the AP, refer to the channel measurement method embodiment, details are not repeated herein.

Figure 18:
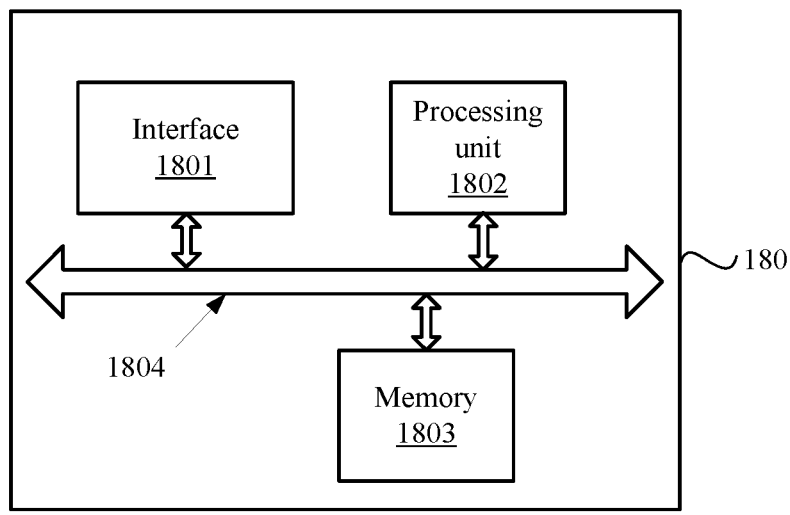
FIG. 18 is a schematic structural diagram of an embodiment of a STA according to the present invention.

FIG. 18 is a schematic structural diagram of an embodiment of a STA according to the present invention. As shown in FIG. 18, the STA 180 provided in this embodiment includes an interface 1801, a processing unit 1802, and a memory 1803. Optionally, the STA 180 may be a first STA in the foregoing embodiment. The processing unit 1802 controls an operation of the STA 180. The interface 1801 sends data or a message under control of the processor 1801. The memory 1803 may include a read-only memory and a random access memory, and provide instructions and data for the processing unit 1802. A part of the memory 1803 may further include a non-volatile random access memory (NVRAM). Components of the STA 180 are coupled together by using a bus system 1804. The bus system 1804 includes not only a data bus, but also a power supply bus, a control bus, and a status signal bus. However, for clear description, various buses are denoted by the bus system 1804 in the diagram.

The method disclosed in the foregoing embodiment of the present invention is applicable to the processing unit 1802, or implemented by the processing unit 1802. During implementation, the operation of the foregoing method embodiments may be executed by the STA 180 by using an integrated logic circuit of hardware in the processing unit 1802 or by using a software instruction. The processing unit 1802 may be a general purpose processor, a digital signal processor, a dedicated integrated circuit, a field programmable gate array or another programmable logic device, a discrete gate or a transistor logic device, or a discrete hardware component, and may implement or execute methods, steps, or logical block diagrams disclosed in the embodiments of the present invention. The general purpose processor may be a microprocessor, any conventional processor, or the like. The steps of the method disclosed with reference to this embodiment of the present invention may be directly implemented by a hardware processor, or may be implemented by a combination of hardware and a software module in a processor. The software module may be located in a random access memory, a flash memory, a read-only memory, a programmable read-only memory or an erasable programmable memory, a register, or another mature storage medium in the art. The storage medium is located in the memory 1803. The processing unit 1802 executes the instructions in the memory 1803, so that the STA 180 performs the steps in the foregoing methods. For an implementation principal and a technical effect of the AP, refer to the channel measurement method embodiment, details are not repeated herein.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor (processor) to perform some steps of the methods described in the embodiments of the present invention. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

It may be clearly understood by persons skilled in the art that, for the purpose of convenient and brief description, division of the foregoing function modules is taken as an example for illustration. In actual application, the foregoing functions can be allocated to different function modules and implemented based on a requirement, that is, an inner structure of an apparatus is divided into different function modules to implement all or some of the functions described above. For a specific working process of the foregoing apparatus, refer to a corresponding process in the foregoing method embodiments, and details are not repeated herein.

It should be understood by persons skilled in the art that the first, the second, and various numbers in this specification are used for differentiation only for ease of description, instead of limiting the scope of the embodiments of the present invention.

It should be understood by persons skilled in the art that sequence numbers of the foregoing processes do not mean execution sequences in various embodiments of the present invention. The execution sequences of the processes should be determined based on functions and internal logic of the processes, and should not be construed as any limitation on the implementation processes of the embodiments of the present invention.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A channel measurement method, comprising:
   sending, by an access point AP, a channel measurement trigger frame TF-S to at least two stations STAs to trigger the at least two STAs to send null data packets NDPs which are used for uplink channel measurement, wherein the TF-S comprises:
   parameter indication information of a transmission parameter used by each STA to send the NDP, wherein the parameter indication information is used by the STA to determine the transmission parameter and a transmission time; and
   a carrier sense indication corresponding to each STA, wherein the carrier sense indication is used to indicate whether the STA needs to perform carrier sense, and if the carrier sense indication indicates that the STA does not need to perform carrier sense, the STA directly sends an NDP to the AP, or if the carrier sense indication indicates that the STA needs to perform carrier sense, the STA performs carrier sense before sending the NDP to the AP; and
   receiving, by the AP, the NDP sent by each of the at least two STAs based on a corresponding transmission parameter of the STA at a transmission time corresponding to the STA, and performing channel measurement, wherein there is no interframe gap between NDPs sent by any two adjacent STAs of the at least two STAs.

2. The method according to claim 1, wherein the parameter indication information of the transmission parameter used by each STA to send the NDP comprises one of or any combination of the following information:
   an association identifier AID of the STA, spatial flow indication information of the STA, and channel resource unit RU indication information used by the STA to send the NDP, wherein
   the AID of the STA is used to indicate that the STA needs to send the NDP to the AP; and the spatial flow indication information of the STA comprises indication information used by the STA to send a training sequence part of the NDP to the AP.

3. The method according to claim 1, wherein the TF-S is comprised in a data part of a physical layer protocol data unit PPDU, a physical layer preamble part of the PPDU comprises trigger frame indication information, and the trigger frame indication information is used to indicate whether the data part comprises a Media Access Control MAC frame of a TF-S type.

4. A channel measurement method, comprising:
   receiving, by a first station STA, a channel measurement trigger frame TF-S sent by an access point AP, wherein:

the TF-S is used to trigger at least two STAs to send null data packets NDPs used for uplink channel measurement; and the TF-S comprises:
  parameter indication information of a transmission parameter used by each STA to send the NDP, and the first STA is one of the at least two STAs; and
  a carrier sense indication corresponding to each STA, wherein the carrier sense indication is used to indicate whether the STA needs to perform carrier sense, and if the carrier sense indication indicates that the STA does not need to perform carrier sense, the STA directly sends the NDP to the AP, or if the carrier sense indication indicates that the STA needs to perform carrier sense, the STA performs carrier sense before sending the NDP to the AP;

determining, by the first STA, a transmission parameter and a transmission time based on the parameter indication information; and sending, by the first STA, an NDP to the AP based on the transmission parameter at the transmission time, wherein there is no interframe gap between the NDP and an NDP sent by any STA adjacent to the STA.

5. The method according to claim 4, wherein the parameter indication information of the transmission parameter used by each STA to send the NDP comprises one of or any combination of the following information:
  an association identifier AID of the STA, spatial flow indication information of the STA, and channel resource unit RU indication information used by the STA to send the NDP, wherein
  the AID of the STA is used to indicate that the STA needs to send the NDP to the AP; and the spatial flow indication information of the STA comprises indication information used by the STA to send a training sequence part of the NDP to the AP.

6. The method according to claim 4, before the sending, by the first STA, an NDP to the AP based on the transmission parameter at the transmission time, further comprising:
  determining, by the first STA based on the carrier sense indication, whether to perform carrier sense; and
  correspondingly, the sending, by the first STA, an NDP to the AP based on the transmission parameter at the transmission time comprises:
  when the first STA determines that carrier sense does not need to be performed, or determines that carrier sense needs to be performed and a sense result is that a channel is idle, sending, by the first STA, the NDP to the AP based on the transmission parameter at the transmission time.

7. A channel measurement apparatus, wherein an access point AP comprises the channel measurement apparatus, and the apparatus comprises:
  a transmitter, configured to send a channel measurement trigger frame TF-S to at least two stations STAs, wherein:
    the TF-S is used to trigger the at least two STAs to send null data packets NDPs used for uplink channel measurement; and
    the TF-S comprises:
      parameter indication information of a transmission parameter used by each STA to send the NDP, and the parameter indication information is used by the STA to determine the transmission parameter and a transmission time; and
      a carrier sense indication corresponding to each STA, wherein the carrier sense indication is used to indicate whether the STA needs to perform carrier sense, and if the carrier sense indication indicates that the STA does not need to perform carrier sense, the STA directly sends the NDP to the AP, or if the carrier sense indication indicates that the STA needs to perform carrier sense, the STA performs carrier sense before sending the NDP to the AP; and
  a receiver, configured to: receive the NDP sent by each of the at least two STAs based on a corresponding transmission parameter of the STA at a transmission time corresponding to the STA, and perform channel measurement, wherein there is no interframe gap between NDPs sent by any two adjacent STAs of the at least two STAs.

8. The apparatus according to claim 7, wherein the parameter indication information of the transmission parameter used by each STA to send the NDP comprises one of or any combination of the following information:
  an association identifier AID of the STA, spatial flow indication information of the STA, and channel resource unit RU indication information used by the STA to send the NDP, wherein
  the AID of the STA is used to indicate that the STA needs to send the NDP to the AP; and the spatial flow indication information of the STA comprises indication information used by the STA to send a training sequence part of the NDP to the AP.

9. The apparatus according to claim 7, wherein the TF-S is comprised in a data part of a physical layer protocol data unit PPDU, a physical layer preamble part of the PPDU comprises trigger frame indication information, and the trigger frame indication information is used to indicate whether the data part comprises a Media Access Control MAC frame of a TF-S type.

10. A channel measurement apparatus, wherein a first station STA comprises the channel measurement apparatus, and the apparatus comprises:
  a receiver, configured to receive a channel measurement trigger frame TF-S sent by an access point AP, wherein:
    the TF-S is used to trigger at least two STAs to send null data packets NDPs used for uplink channel measurement; and
    the TF-S comprises:
      parameter indication information of a transmission parameter used by each STA to send the NDP, and the first STA is one of the at least two STAs; and
      a carrier sense indication corresponding to each STA, wherein the carrier sense indication is used to indicate whether the STA needs to perform carrier sense, and if the carrier sense indication indicates that the STA does not need to perform carrier sense, the STA directly sends the NDP to the AP, or if the carrier sense indication indicates that the STA needs to perform carrier sense, the STA performs carrier sense before sending the NDP to the AP;
  a processor, configured to determine a transmission parameter and a transmission time based on the parameter indication information; and
  a transmitter, configured to send an NDP to the AP based on the transmission parameter at the transmission time, wherein there is no interframe gap between the NDP and an NDP sent by any STA adjacent to the STA.

11. The apparatus according to claim 10, wherein the parameter indication information of the transmission parameter used by each STA to send the NDP comprises one of or any combination of the following information:
- an association identifier AID of the STA, spatial flow indication information of the STA, and channel resource unit RU indication information used by the STA to send the NDP, wherein
- the AID of the STA is used to indicate that the STA needs to send the NDP to the AP; and the spatial flow indication information of the STA comprises indication information used by the STA to send a training sequence part of the NDP to the AP.

12. The apparatus according to claim 10, further comprising:
- the processor, further configured to determine, based on the carrier sense indication, whether to perform carrier sense; and
- correspondingly, the sending module is specifically configured to:
- when the second determining module determines that carrier sense does not need to be performed or determines that carrier sense needs to be performed and a sense result is that the channel is idle, send the NDP to the AP based on the transmission parameter at the transmission time.

* * * * *